United States Patent [19]

Merrick et al.

[11] 4,145,593

[45] Mar. 20, 1979

[54] AUTOMATIC PIPE WELDING SYSTEM

[75] Inventors: George J. Merrick, Franklin; George E. Cook, Brentwood; Donald D. Modglin, Nashville, all of Tenn.

[73] Assignee: Merrick Welding International, Inc., Nashville, Tenn.

[21] Appl. No.: 654,975

[22] Filed: Feb. 3, 1976

[51] Int. Cl.² .............................................. B23K 9/12
[52] U.S. Cl. ............................ 219/60 A; 219/125.11; 219/137 R
[58] Field of Search ..................... 219/60 A, 60 R, 61, 219/125 R, 125 PL, 124, 131 R, 137 R, 121 R, 135, 124.1, 125.1, 125.11

[56] References Cited

U.S. PATENT DOCUMENTS

| | | | |
|---|---|---|---|
| 2,832,000 | 4/1958 | Steele | 219/124 |
| 3,163,743 | 12/1964 | Wroth et al. | 219/121 R |
| 3,267,251 | 8/1966 | Anderson | 219/125 |
| 3,555,239 | 1/1971 | Kerth | 219/131 R |
| 3,651,290 | 3/1972 | Durbin et al. | 219/60 A |
| 3,737,614 | 6/1973 | Paulange | 219/60 A |
| 3,777,115 | 12/1973 | Kazlauskas et al. | 219/60 R |
| 3,838,244 | 9/1974 | Petrides et al. | 219/60 R |
| 4,019,016 | 4/1977 | Friedman et al. | 219/135 |

FOREIGN PATENT DOCUMENTS

| | | | |
|---|---|---|---|
| 38-21879 | 10/1963 | Japan | 219/125 R |
| 44-6456 | 11/1969 | Japan | 219/125 R |
| 192321 | 4/1967 | U.S.S.R. | 219/60 A |

Primary Examiner—J. V. Truhe
Assistant Examiner—Clifford C. Shaw
Attorney, Agent, or Firm—Jones, Thomas & Askew

[57] ABSTRACT

Apparatus for rapid and automatic welding of joints which interconnect sections of pipe, and in particular oil or gas transmission pipe. The system includes at least one torch transport assembly which simultaneously moves a plural number of welding torches along a path parallel to the pipe joint being welded. The torch transport assembly includes track segments which surround circumferential portions of the pipe joint, with a welding torch carrier and multiple torches being independently movable along each track segment. The torch transport assembly is mounted on a support apparatus which is rigidly clamped to the pipe sections during welding, and which permits the torch transport assembly to be rapidly positioned in rough alignment with a pipe joint. The torch transport assembly and selected operating parameters of each welding torch are adjusted to accurately position each torch with respect to the pipe joint, and to repeatably provide programmed welding parameters resulting in a uniform pipe joint weld. The present system is disclosed in the context of hot-wire gas-tungsten arc welding torches, and in the operating environment of out-of-position joint welding.

8 Claims, 27 Drawing Figures

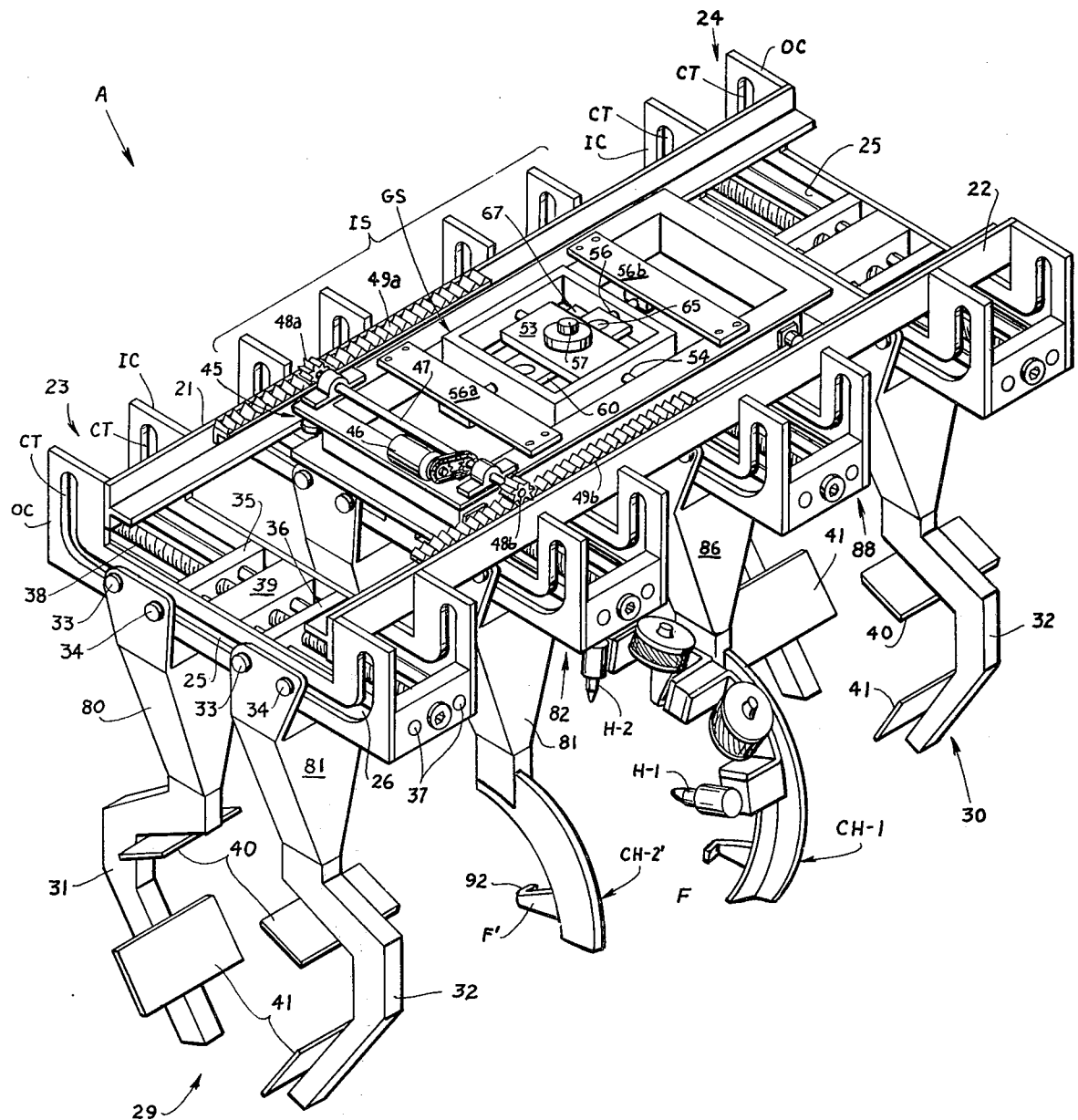
Fig_2

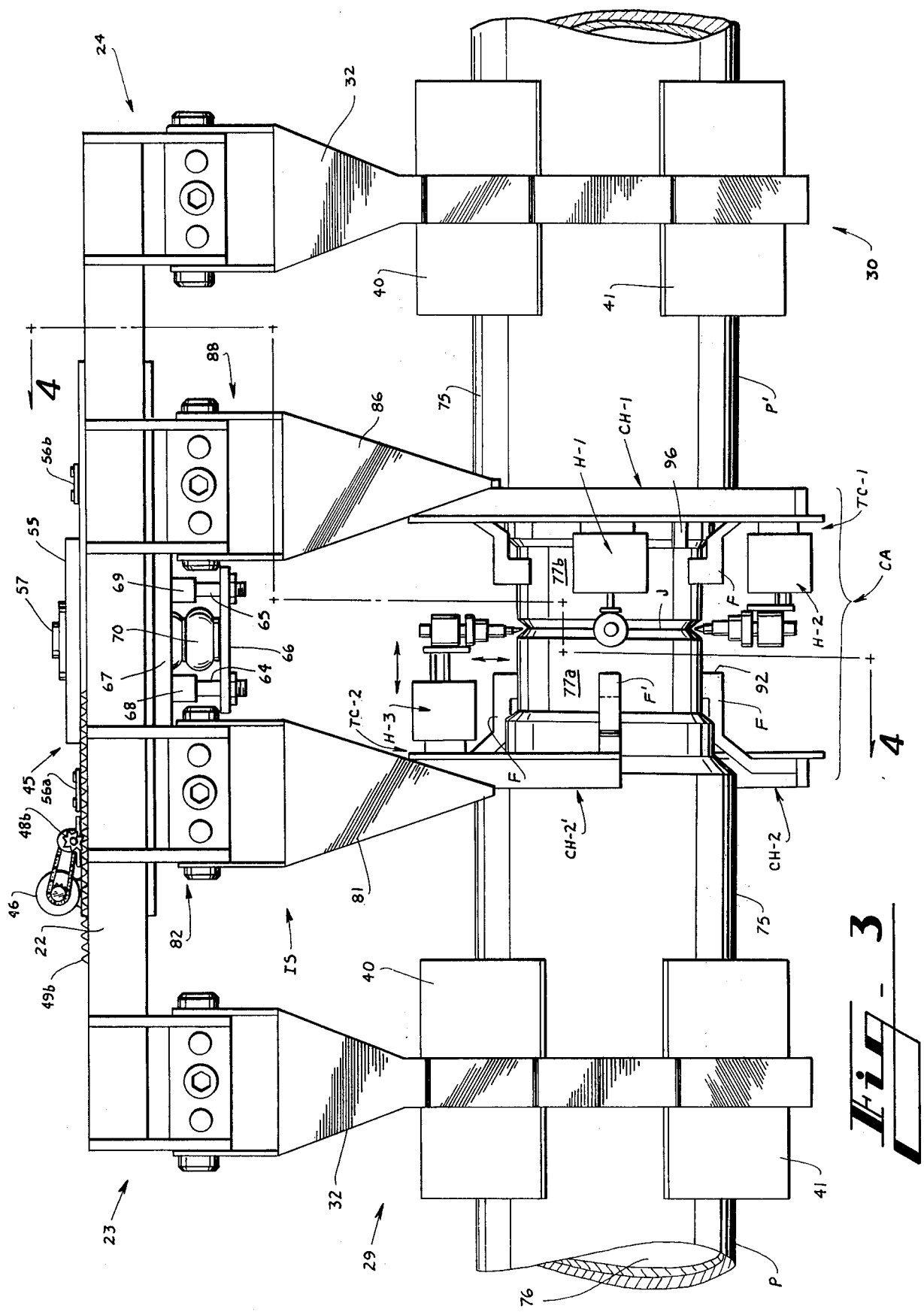

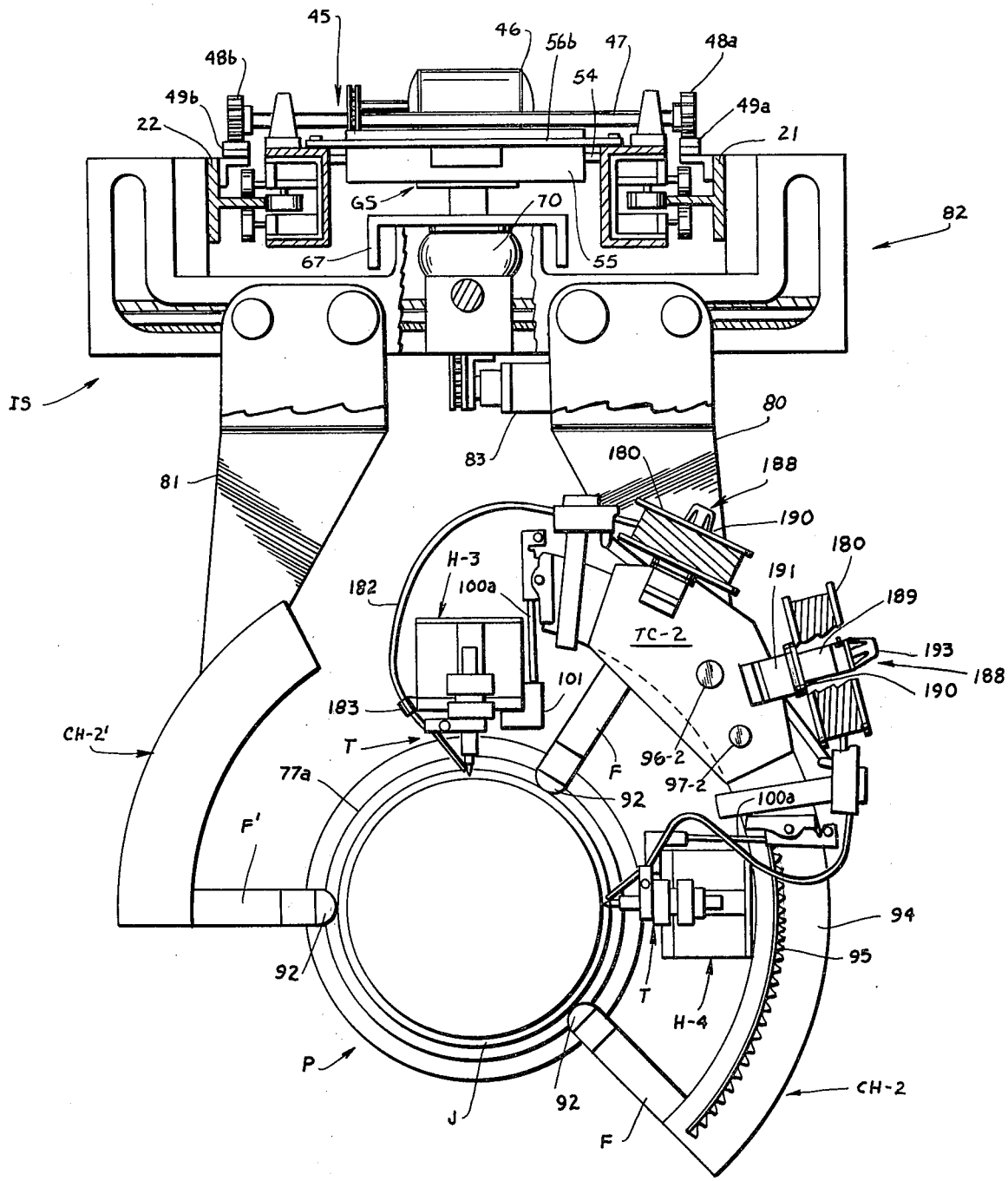

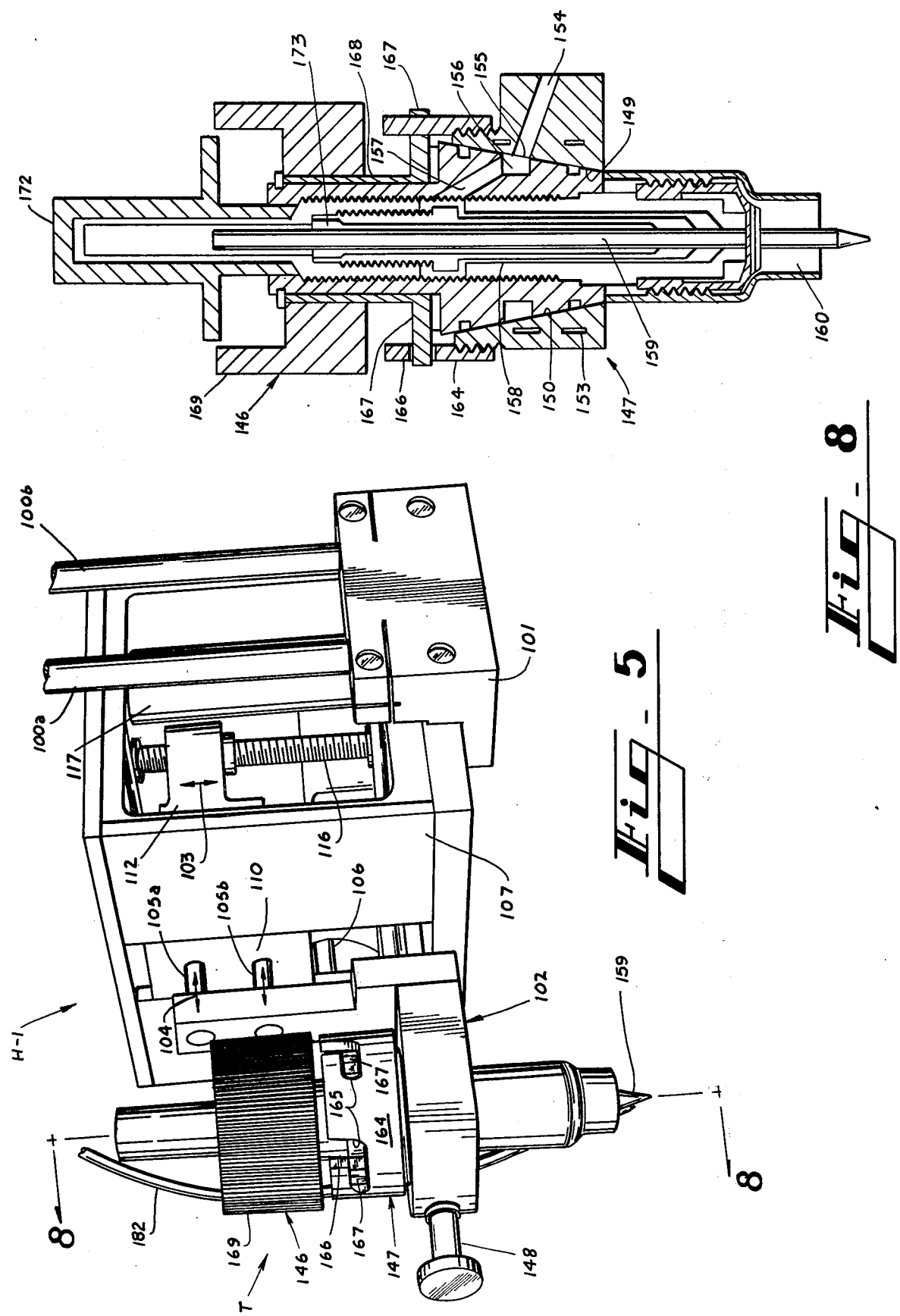

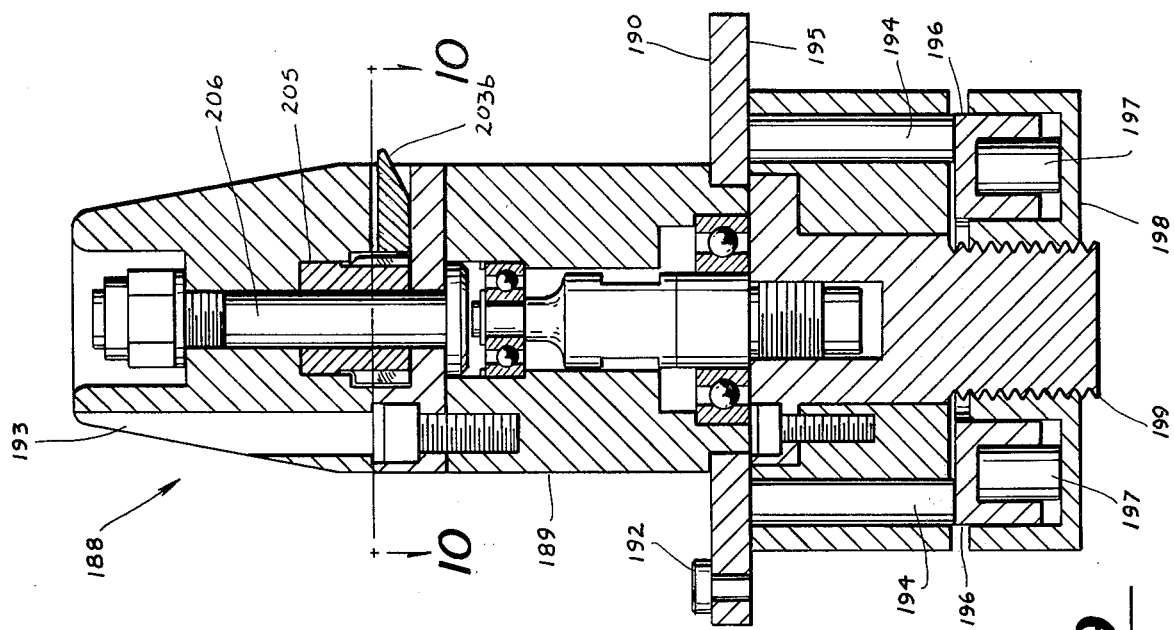
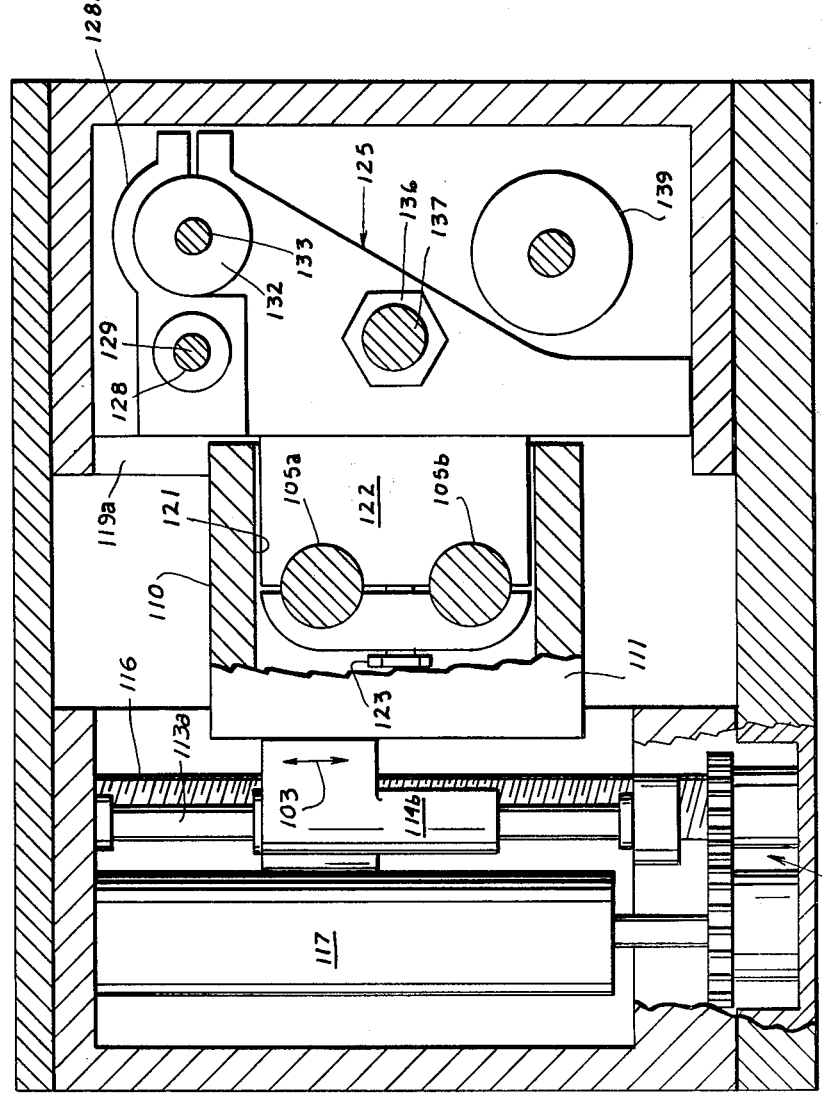
Fig-9
Fig-7

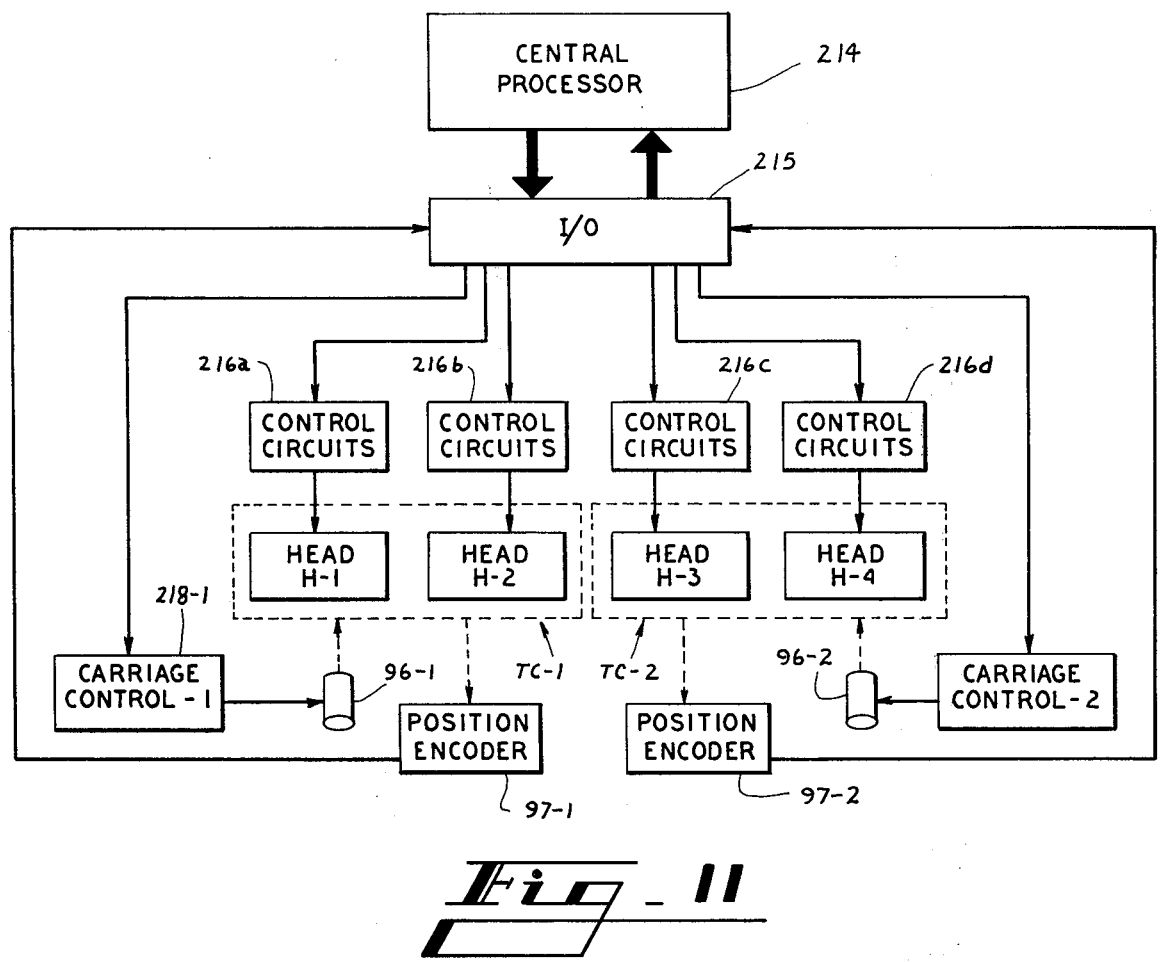
*Fig_11*
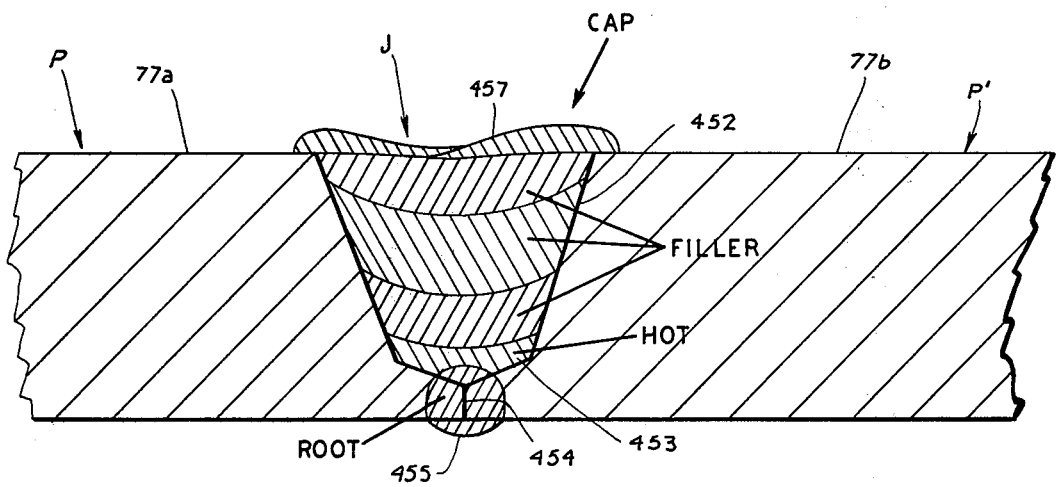
*Fig_12*

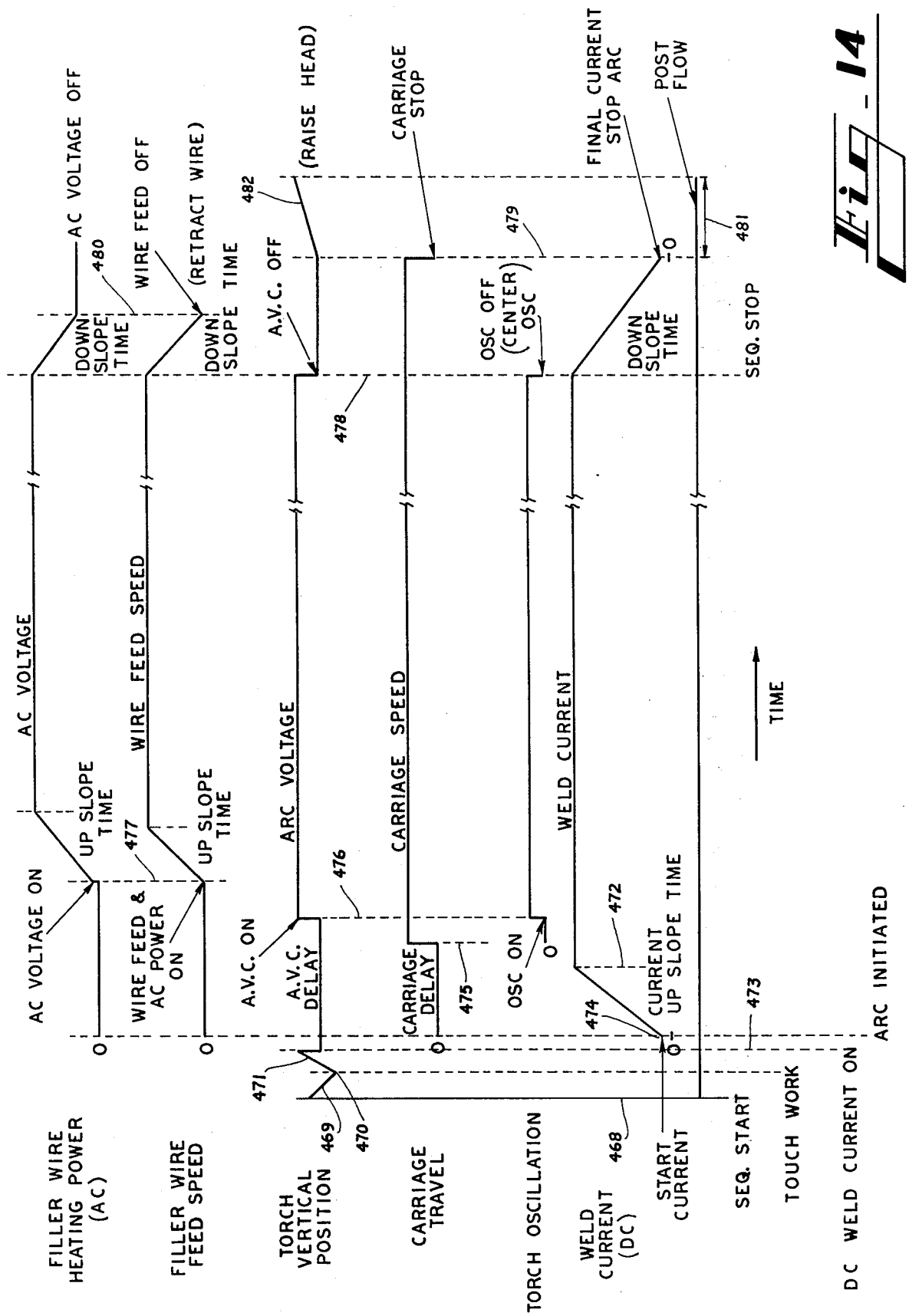

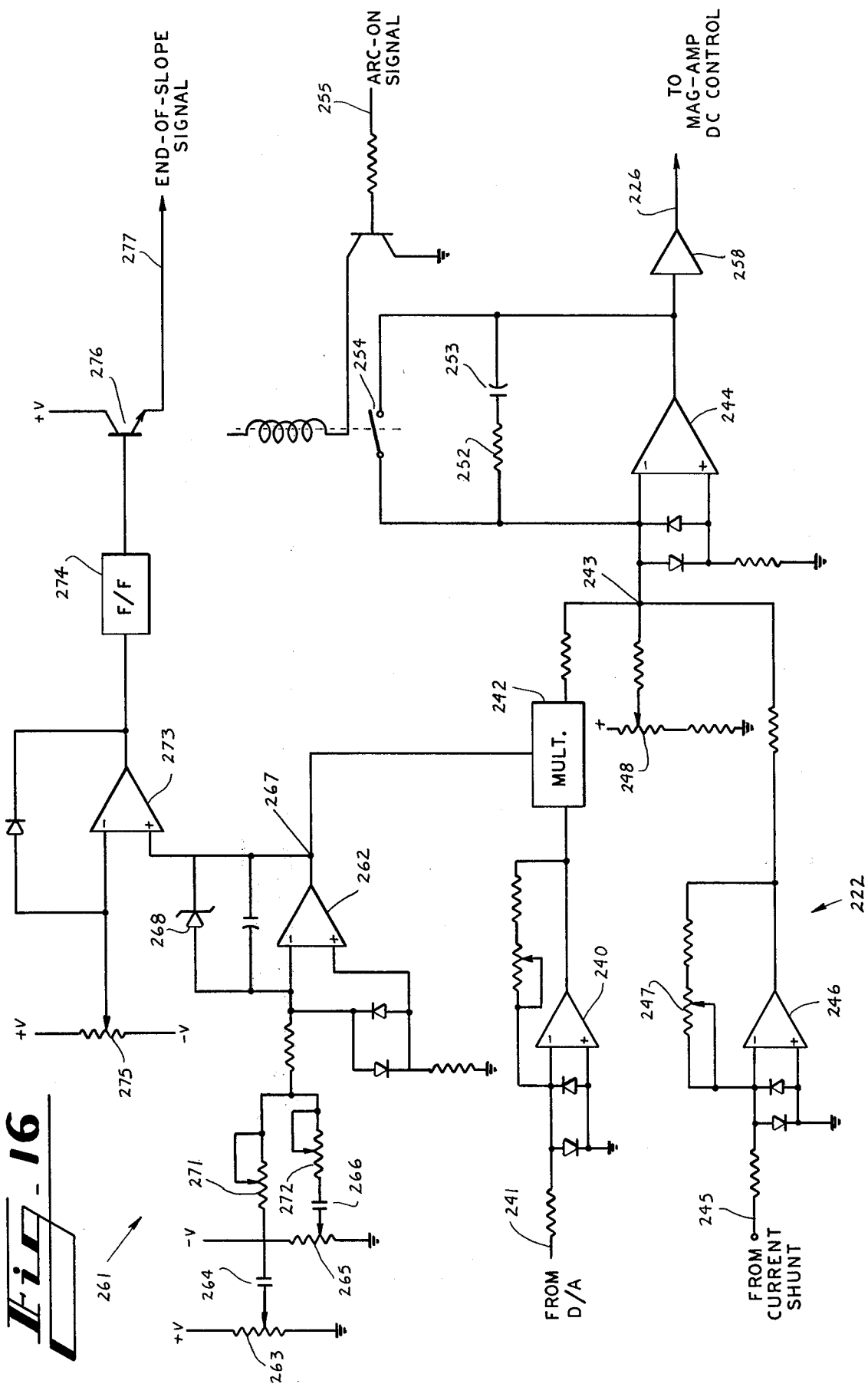

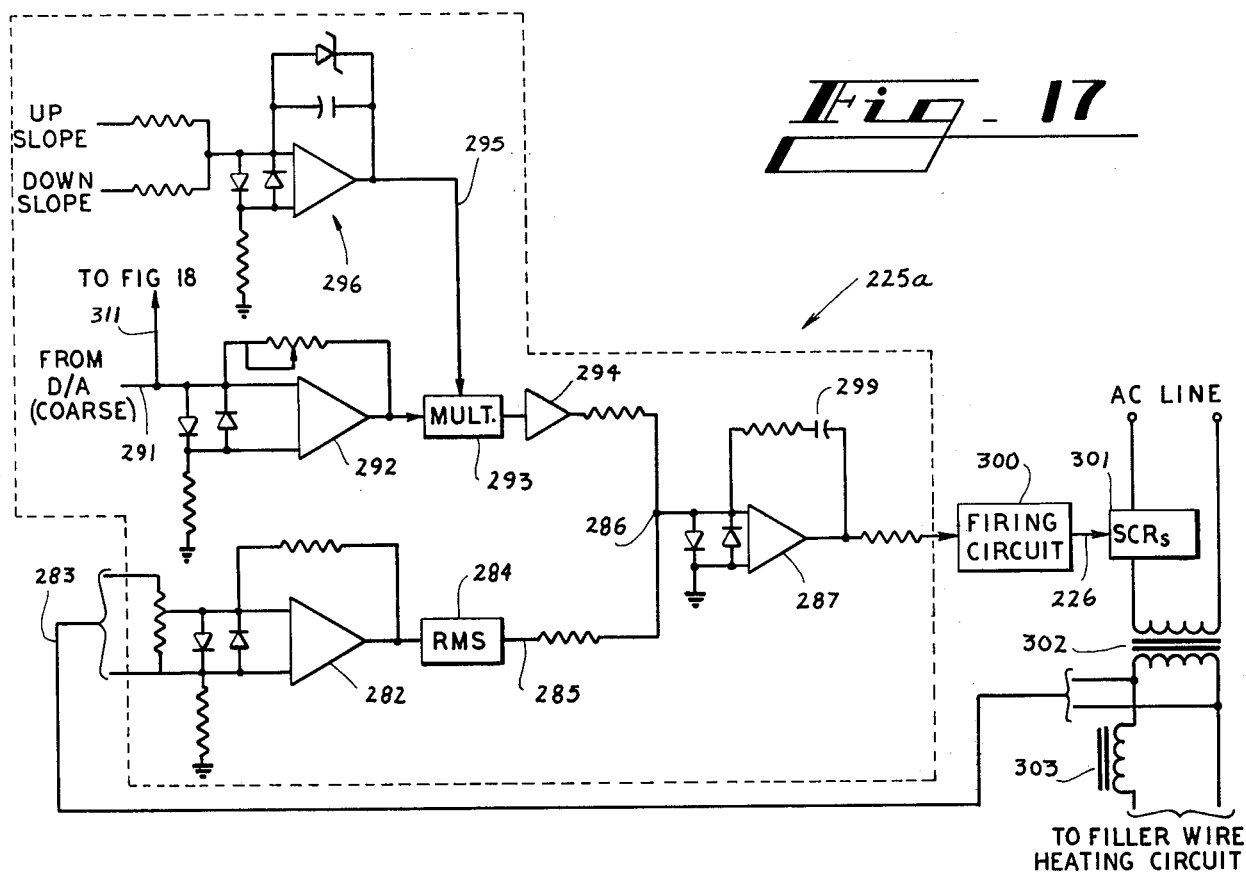
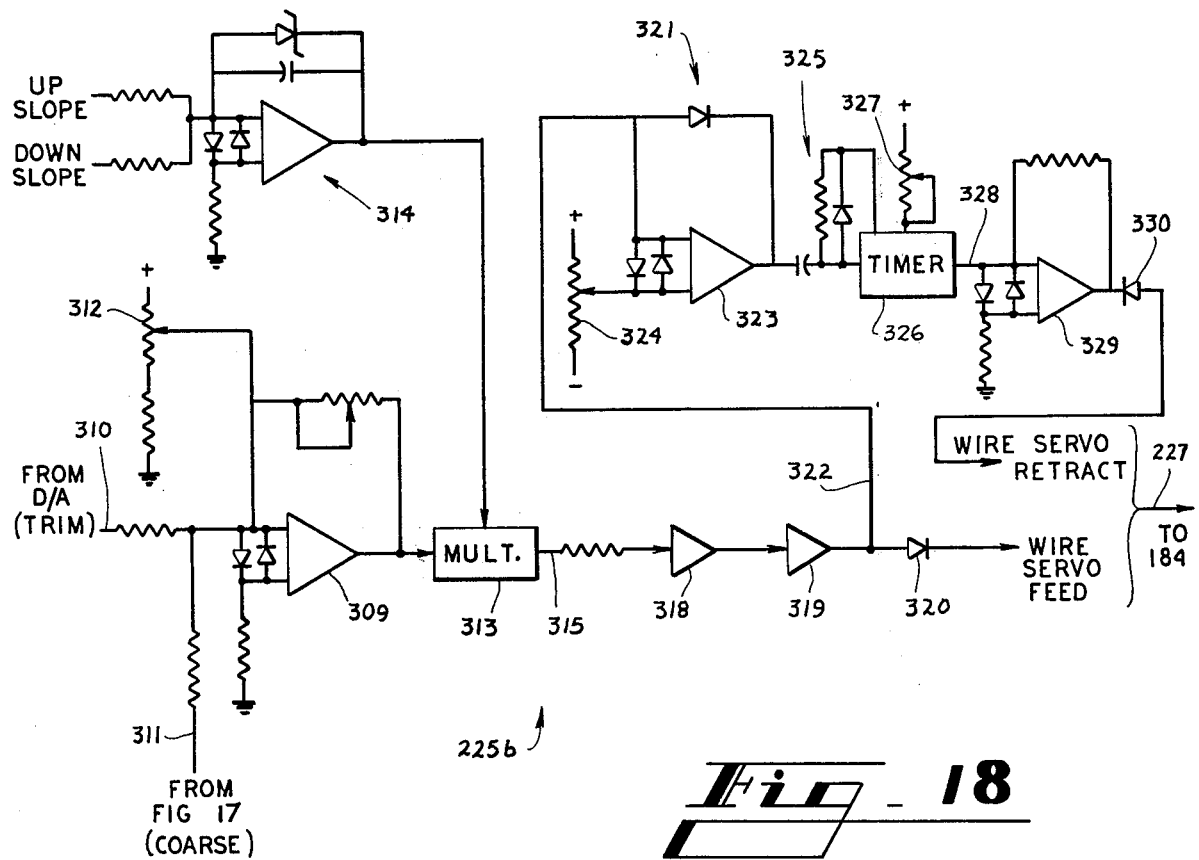

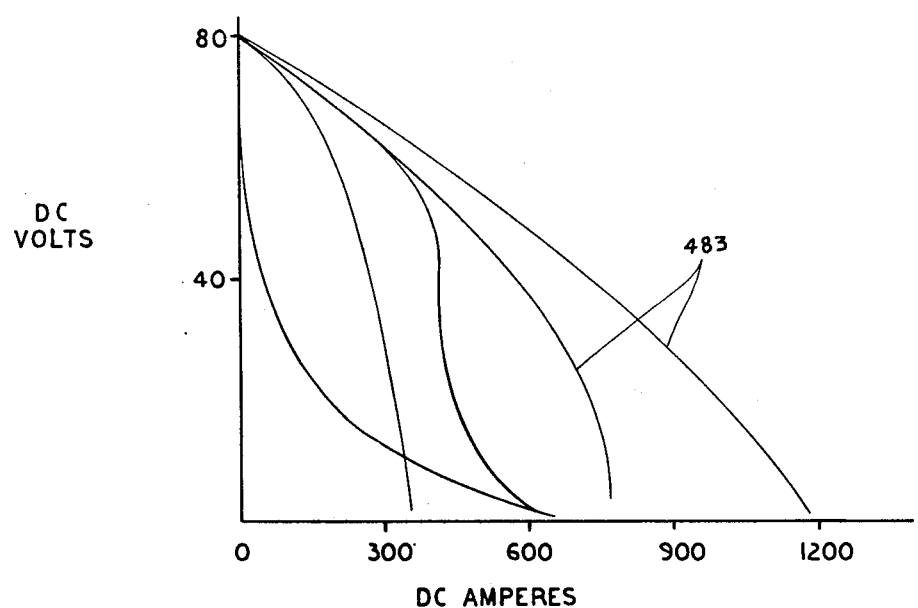
PRIOR ART
Fig_23A
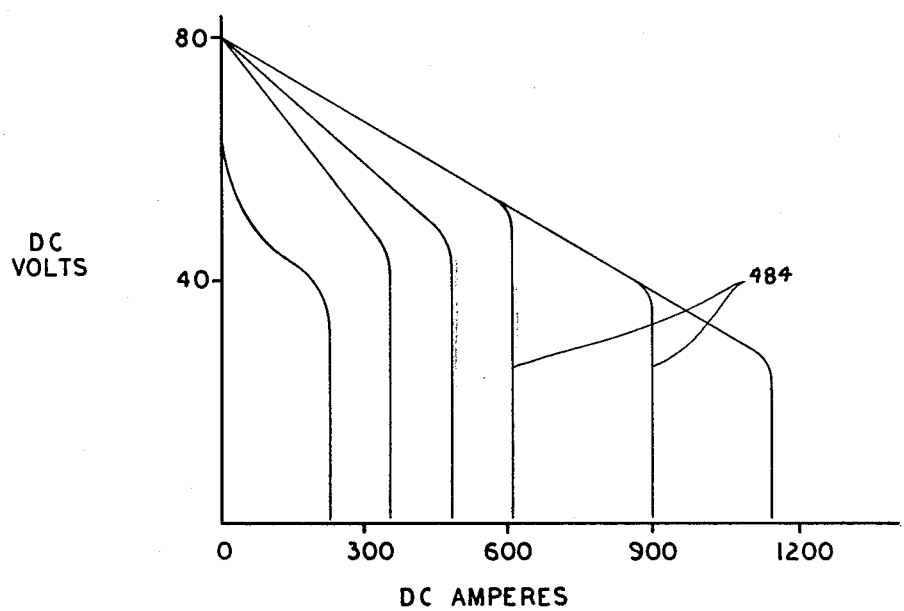
Fig_23B

AUTOMATIC PIPE WELDING SYSTEM

This invention relates in general to welding and in particular to off-axis welding of pipeline in which a welding torch is traversed with respect to a relatively stationary workpiece.

Transmission pipelines are frequently used to transport fluid products for substantial distances, with oil and gas transmission pipelines being but two well-known examples. Such pipelines are generally constructed of individual pipe sections that are joined together by welding, and it is important that each welded pipe joint meet the criteria necessary for safe operation of the pipeline. Not only is the detection and repair of defective joints an extremely expensive undertaking, particularly where the pipeline is buried underground or submerged beneath the sea, but the existence of a defective weld joint creates a hazard of catastrophe in the case of pipelines which carry flammable products.

The separate lengths of pipe which make up an oil or a gas transmission pipeline are typically interconnected by electric-arc welding, and many types of welding techniques are used or proposed in the art for that purpose. Perhaps the simplest welding technique is shielded metal arc welding, commonly known as "stick welding", in which one or more persons manually weld each joint using hand-held welding torches of conventional design. Since each welded joint of a typical pipeline actually consists of several separate weld segments or layers, known as "passes", manual welding techniques are time-consuming and costly in view of the large number of welded pipe joints to be welded in a pipeline extending for many miles. The relative slowness of manual and other conventional welding techniques is particularly troublesome in pipe laying operations where wages and equipment expenses provide a costly overhead which must be rationalized by maximizing the number of acceptable welds that can be produced per unit of time.

Lay-down operations for underwater pipeline typically present an extreme example of operating overhead costs, since all pipe welding and related operations must take place on a barge or other vessel with maintenance costs in addition to the costs of crew and equipment directly related to laying the pipeline. Such barges are subjected to the wave motion of the prevailing sea state, moreover, so that even relatively massive barges frequently present a moving work surface relative to the completed portion of pipeline which extends from the barge into the sea. It has been found that the pipeline cannot be rigidly clamped to the deck of the lay-down barge, since sea-induced movements of the barge can readily damage the pipeline. Such problems further complicate the task of welding sections of pipe to the completed portion of the pipeline.

Welding devices have been proposed which traverse a welding torch about the circumference of a pipe joint while welding the joint. Since it is obviously impossible to rotate the joint end of a pipeline which may extend for many miles from a laydown barge (or any other joint welding site), automatic pipe welding equipment generally traverse a welding torch circumferentially about the pipe joint. Those skilled in the art will recognize that "off-axis" welding, that is, welding applications where the welding torch departs from an upright vertical position, becomes increasingly difficult as the welding torch departs the 12 o'clock or upright position in its passage around the pipe joint. The weld puddle is subjected to natural forces including gravity, surface tension, and capillary attraction within the grooved joint being welded, and the net force acting on the puddle constantly changes as the torch traverses about the circumference of a pipe joint which is in a nonhorizontal plane. When the torch is welding at the 6 o'clock position, maximum care must be exercised to prevent the weld puddle from falling out of the weld by gravity.

It has been proposed to overcome gravitational pullout of the weld puddle during off-axis welding by applying pulsed welding current to the torch, so that the weld puddle will slightly congeal during each "off" portion of the pulsed weld current. The operating speed of welding torches receiving pulsed welding current must be correspondingly reduced, however, and it is possible that the welds which are produced by the pulse-induced intermittent partial cooling may have undesirable metallurgical properties.

The speed at which a pipejoint can be welded is determined by the maximum rate at which the welding torch can deposit weld metal while traversing a pipe joint which is in a nonhorizontal plane. While gas metallic arc (MIG) welding torches generally have a relatively high rate of metal deposition, such torches generally produce welds that are nonuniform and difficult to repeatably obtain. Gas tungsten arc (TIG) welding torches are known to produce a pipe joint weld of superior and more repeatable quality, although the metal deposition rate for TIG welding torches is relatively slow. A development known as the hot-wire TIG torch, in which electric current is passed through the filler wire to preheat the filler wire which is melted in the weld puddle, is known to produce a substantially increased rate of metal deposition, relative to conventional TIG welding. The lack of sufficiently precise and repeatable weld parameter control of prior-art hot-wire TIG welding torches, however, along with the aforementioned problem of off-axis weld puddle control and related problems, have heretofore kept the metal-deposition rates of hot-wire TIG torches from being fully realized in pipeline welding applications. A description of hot-wire TIG welding is set forth in U.S. Pat. No. 3,122,629.

Accordingly, it is an object of the present invention to provide an improved apparatus for welding along a predetermined path of workpieces such as pipe joints or the like.

It is another object of the present invention to provide apparatus for automatically welding pipe joints and the like, at an improved rate of metal deposition and with an improved quality of weld.

It is another object of the present invention to provide a pipeline welding system in which precise alignment of one or more welding torches can be accomplished with only rough positioning of one or more torch carriers in relation to a pipe joint being welded.

Still another object of the present invention is to provide a programmable welding system in which selected welding parameters are automatically varied in relation to welding torch position or other factors.

Stated in general terms, the present invention comprises a pipe-engaging support apparatus which positively engages two sections of pipe adjacent a common joint; a welding torch transport means which is supported by the support means, and which is movable relative to the support means for positioning in proximity to the pipe joint; and control means which controls selected operating parameters of one or more welding torches associated with the torch transport means. Stated somewhat more specifically, the torch transport means is connected to the support means for movement along several degrees of freedom relative to the support means and the pipeline sections engaged by the support means, so that welding torches associated with the torch transport means are maintained in fixed relation with the pipeline irrespective of pipeline movements relative to a barge deck or other off-pipeline work station. The torch transport means includes track sections which are parallel to the joint, and carriages which are movable along each track. Each carriage supports one or more welding torches in angular offset relation, relative to the circumference of the pipe joint to be welded. Each carriage as well as each welding torch carried by the plural carriages, is independently operable to provide preselected optimal welding parameters for the particular circumferential position of each welding torch relative to the circumferential pipe joint being welded. Automatic control of the arc length for each torch, as well as electrical adjustment of the center point of weld-joint traverse oscillation for each torch, permits the torches to independently maintain a precision track about the pipe joint irrespective of possible eccentricity of the support means and carriages with respect to the pipe joint.

The foregoing and other objects and advantages of the present invention will become more readily apparent from the disclosed preferred embodiment as described below with respect to the drawings, in which:

FIG. 2 shows a pictorial view of one welding station according to the disclosed embodiment;

FIG. 3 is a vertical plan view of the welding station shown in FIG. 2;

FIG. 4 is a vertical section view taken along line 4—4 of FIG. 3;

FIG. 5 is a detailed pictorial view of a welding head assembly used in the disclosed embodiment;

FIG. 7 is a rear elevation view of the mechanism shown in FIG. 6;

FIG. 8 is a section view of a welding torch assembly taken along line 8—8 of FIG. 5;

FIG. 9 is a vertical section view of a filler wire spool holder according to the disclosed embodiment of the present invention;

FIG. 11 is a block diagram showing the overall control system of the disclosed embodiment;

FIG. 12 is a section view, taken transverse to the weld pass direction, showing one example of a multiple-pass welded joint made with the present apparatus;

FIG. 14 shows an example of an operating sequence which the disclosed apparatus undergoes during a typical weld pass;

FIG. 16 is a schematic diagram of the DC welding current control for one of the welding head control circuits of the present invention;

FIG. 17 is a schematic diagram of the AC filler wire heating power control for one of the welding head control circuits of the present invention;

FIG. 18 is a schematic diagram of the filler wire feed control for one of the welding head control circuits of the present invention;

Figure 22A:
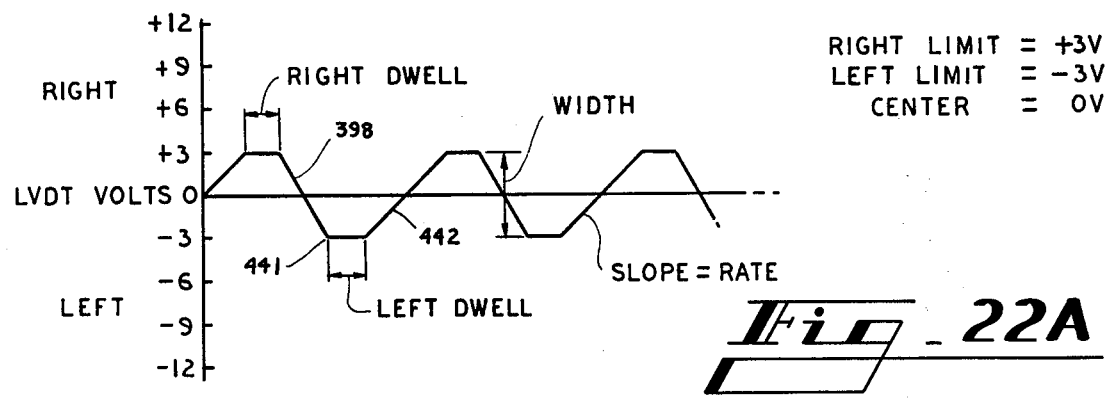
Figure 22B:
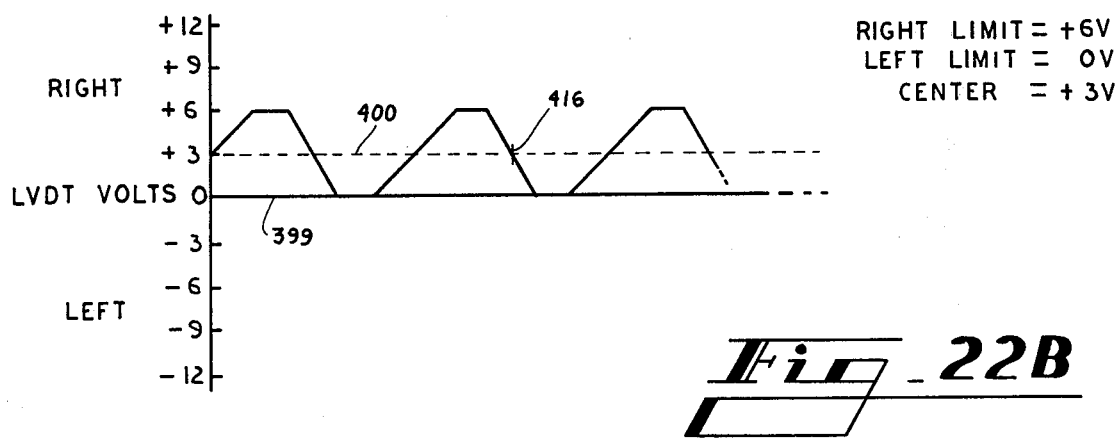

FIGS. 22A and 22B graphically depict two examples of torch oscillation control provided by the present invention;

FIG. 23A shows typical DC welding volt-ampere curves which are obtainable with welding power supplies of the prior art; and FIG. 23B shows typical DC welding volt-ampere curves which are obtained with the welding current of the present invention.

Support Apparatus

Figure 1:
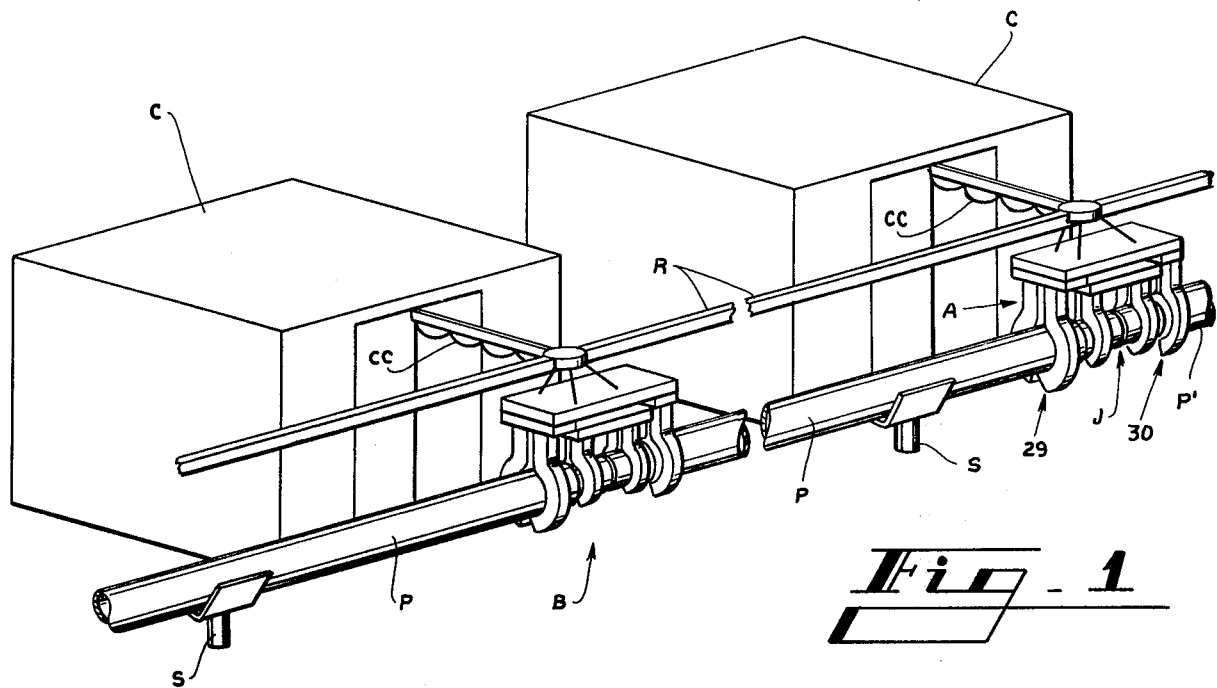
FIG. 1 is a pictorial view of a two-station pipeline welding system according to the disclosed embodiment of the present invention.

Turning to FIG. 1, there is shown generally at 20 a two-station pipeline welding system comprising a first welding station A and a second welding station B. Each of the welding stations A and B is shown as being suspended from a rail R which is supported above and generally parallel to the several depicted sections of pipe P. The pipe section P' may arbitrarily be considered to be the head-end section of an already-completed pipeline of indefinite length, while the other sections of pipe P depicted in FIG. 1 represent pipe sections which are in the process of being welded onto the pipe section P' to constitute an extension of the pipeline. Support members S may be provided for supporting the several pipe sections P, and it will be understood that suitable support means (not shown) is provided to maintain the rail R in the depicted position.

Associated with each welding station A and B is a separate control room C, which typically houses the power supplies and operational control apparatus associated with each of the welding stations. Welding power and control signals are supplied to each welding station through suitable cables CC.

Those skilled in the art of pipeline welding will understand that a weld interconnecting two sections of pipe is typically composed of several separately-applied welding passes. The first such pass, typically called the "root pass", mechanically joins together the adjacent ends of two pipe sections. The root pass may be followed by a "hot pass", and then by one or more "fill passes" which primarily serve to fill the space between abutting ends of the pipe sections with filler metal, and the final or "cap pass" provides the exterior surface of the welded joint. It is frequently desirable to provide the root pass and one or more fill passes at a first welding station A, for example, while the remaining fill passes and the cap pass may be provided at a second welding station B. It will be understood, however, that more than the two disclosed welding stations may be employed in a typical production pipeline welding situation; it should also be understood that each of the welding stations A and B disclosed herein can be identical in construction, and only a single such station may be provided for all welding passes of each pipe joint.

Turning to FIG. 2, the welding station A is seen to have an outer frame provided by the elongated rails 21 and 22. Respective ends of the rails 21 and 22 are rigidly attached to the clamp cam assemblies 23 and 24, with each such clamp cam assembly including an outer cam plate OC, positioned adjacent the outer extremities of the respective rails, and an inner cam plate IC spaced inwardly therefrom. Each of the outer cam plates OC and inner cam plates IC contain an internal cam track CT, with each cam track CT having a substantially level elongated portion 25 of each cam track CT forms a continuous interconnection with end portions 26 which extend upwardly from the elongated portions.

Depending downwardly from each of the clamp cam assemblies 23 and 24 is a corresponding pair of outer clamp assemblies 29 and 30, each of which includes the separate outer clamp arms 31 and 32. Each of the outer clamp arms 31 and 32 is mounted for sliding movement along a corresponding cam track CT by a pair of bearing members 33 and 34, with each bearing member 34 being carried by a block 35 mounted within the outer cam plate OC and inner cam plate IC for sliding movement along a pair of guide rods 37. Each of the sliding blocks 35 and 36 engages the lead screw 38 which is rotatably mounted between the two guide rods 37, and a suitable motor 39 is provided to selectably rotate the lead screw in either direction. The lead screw 38 has counter-rotating threads respectively engaging the blocks 35 and 36, so that rotation of the lead screw in a given direction moves the blocks in opposite direction relative to each other. The outer clamp arms 31 and 32 translate laterally away from the pipe section P as the lead screw 38 turns in the proper direction, while the sliding blocks 33 and 34 travel along the level portion 25 of the cam track CT. As the blocks 34 move into the upturned portions 26, however, each outer clamp arm pivots about the block 33 to swing completely free of the pipe section.

Each of the outer clamp arms 31 and 32 extends downwardly from the clamp cam assembly 23, for example, to a lower terminus configured to surround and clamp onto the exterior of a pipe section P without puncturing or otherwise damaging the pipe exterior. Each of the outer clamp arms 31 and 32 carries a pair of clamping plates 40 and 41 which are disposed on the respective clamp arms to make proximately tangential contact with the exterior of a pipe section.

An inner support frame 45 is mounted on the rails 21 and 22 for longitudinal sliding movement therealong, between the clamp cam assemblies 23 and 24. The inner support frame 45 is traversed along the rails 21 and 22 by a drive mechanism including the motor 46 which is mounted on the inner support frame, and which drives the shaft 47 the ends of which are provided with gears 48a and 48b meshing with rack gears 49a and 49b mounted on respective rails 21 and 22. Operation of the motor 46 propels the inner support frame 45 in a selected direction along the rails 21 and 22. When the outer lamp assemblies 29 and 30 are clamped onto adjacent pipe sections P and P', as shown in FIG. 1, it will be understood that the inner support frame 45 is longitudinally movable relative to the pipe joint J between the two pipe sections.

The inner support frame 45 carries a gimbal support assembly GS, which in turn carries an inner assembly IS with several degrees of freedom relative to the inner support frame 45. The inner assembly, which is explained in detail below, includes apparatus for supporting the plural welding heads and for positioning the welding heads in concentric location with respect to the pipe joint J.

The gimbal support assembly GS, as best seen in FIG. 2, includes a gimbal frame 55 which is pivotally supported by the axis 56 between lateral support members 56a and 56b which extend between the two longitudinal sides of the inner support frame 45, so that the gimbal frame can pivot about the axis 56 which is parallel to the longitudinal axis of the pipe sections P onto which the outer clamp assemblies 29 and 30 are clamped. The support plate 53 is mounted within the gimbal frame 55 on axis 56 which is transverse to the axis 56, and another support plate 60 is mounted immediately below the plate 53. The plates 53 and 60 are interconnected by the vertical pivot connection 57, so that the support plate 60 is supported by the pivot connection 57 for rotation about an axis which is perpendicular to the axes 54 and 56.

A pair of guide rods 64 and 65 are attached to the support member 60 and extend downwardly into engagement with the end plate 66, best shown in FIG. 3. A channel member 67, having a longitudinal dimension aligned with the support member 60, is retained between the support member 60 and the end plate 66 by apertures through which the two guide rods 64 and 65 are slidably received. The bushings 68 and 69 guide the sliding movement of the channel member 67 along the guide rods 64 and 65. A selectably expandable device such as the inflatable air bag 70 or the like is interposed between the end plate 66 and the channel member 67, so that the channel member can be selectably raised or lowered within limits determined by the free travel of the channel member along the guide rods 64 and 65. The entire inner assembly IS is thus able to move along the axes of freedom relative to the inner support frame 45.

The pipe sections P frequently surround the steel pipe 76 with an outer protective layer 75 of cementitious material or the like, and the protective layer 75 is missing from each end of the pipe sections to permit access of welding torches to the pipe joint J, as best shown in FIG. 3. The outer clamp assemblies 29 and 30 grip the protective coating 75 of the respective pipe sections P and P', providing the main support for the entire first welding station A and providing only an approximate positioning of the welding station relative to the pipe 76 within the protective coating. After the protective coating of the pipe is engaged by the outer clamp assemblies 29 and 30 and the inner assembly IS has been positioned relative to the joint J, the inner assembly is clamped onto the pipe joint ends 77a and 77b of the respective pipe sections P and P'.

The inner assembly IS, in the disclosed embodiment of the present invention, includes two split clamp assmeblies which removably engage the pipe sections, one clamp assembly per pipe joint end. Each clamp assembly comprises a pair of half-clamps, and each pair of half-clamps includes a track and a carriage assembly which moves therealong in a path which is parallel to the pipe joint being welded. Two welding head assemblies are attached to each carriage assembly and are movable therewith about the track, with the two welding head assemblies on each carriage being offset approximately 90° apart about the carriage track. The two clamp assemblies have substantially identical configurations, in mirror image, and the two carriages associated with the two clamp assemblies are each driven through approximately 90° of travel so that each of the four welding head assemblies contributes approximately 90° of a complete circular weld pass on the pipe joint.

Figure 3A:
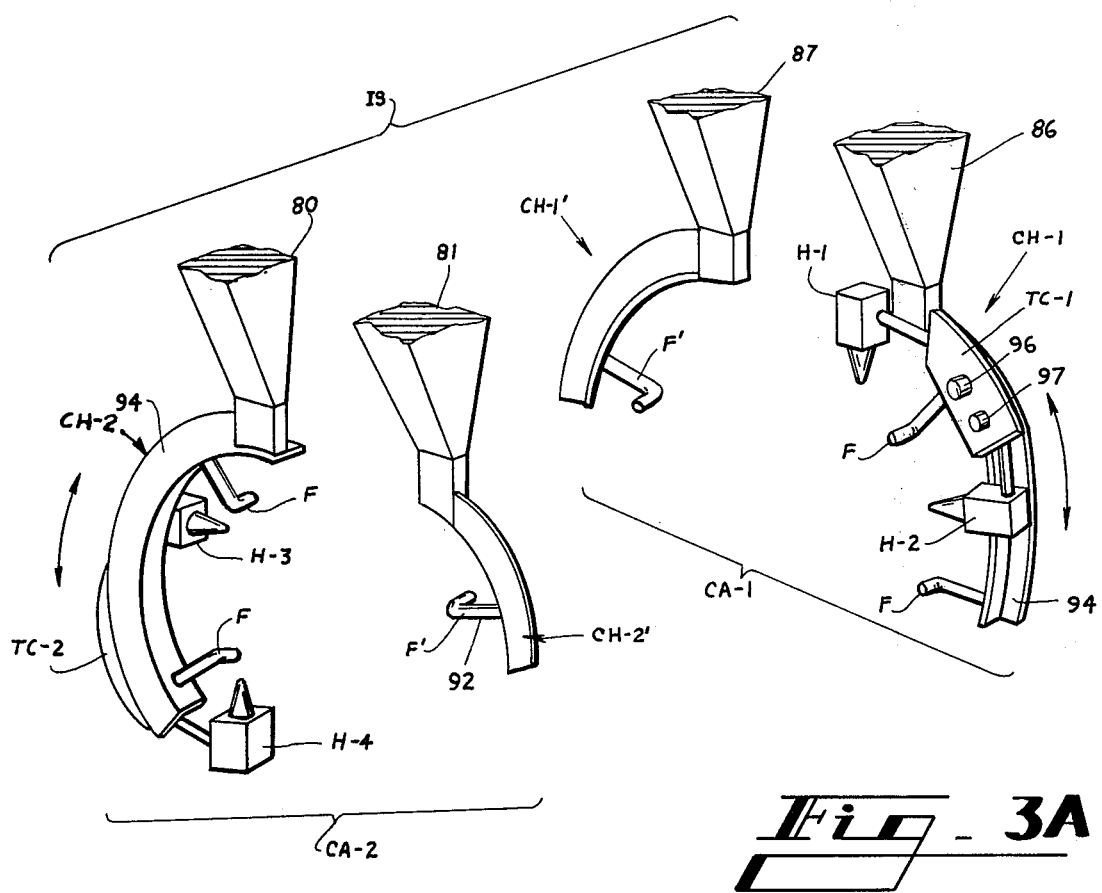
FIG. 3A is a fragmentary pictorial view of the inner assembly taken from the viewpoint of FIG. 3, showing the spatial relation of the welding assembly portion of the welding station in FIG. 2.
Figure 6:
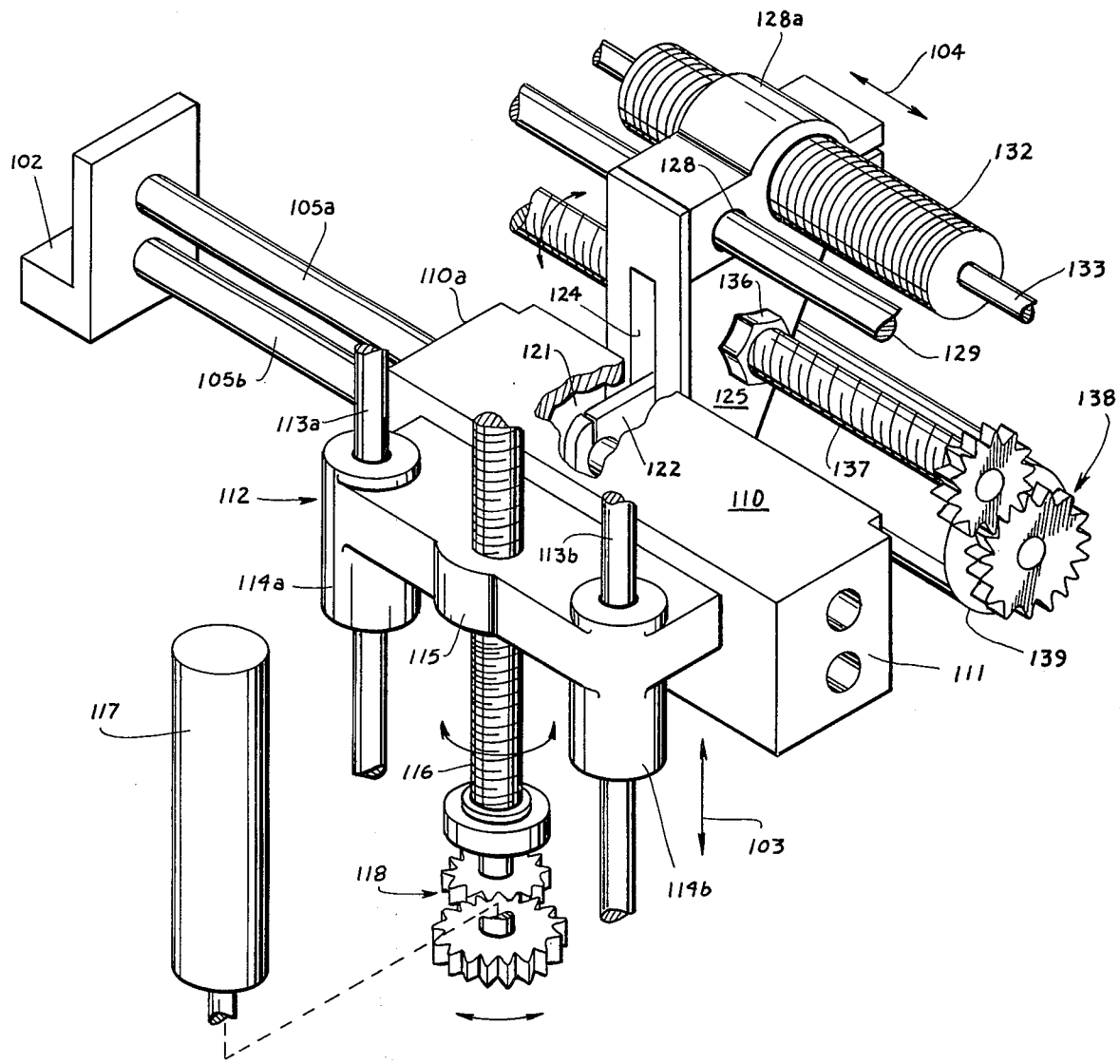
FIG. 6 is a pictorial view, partially broken away, of the mechanism which provides automatic voltage control and oscillation of one of the welding head assemblies.
Figure 7A:
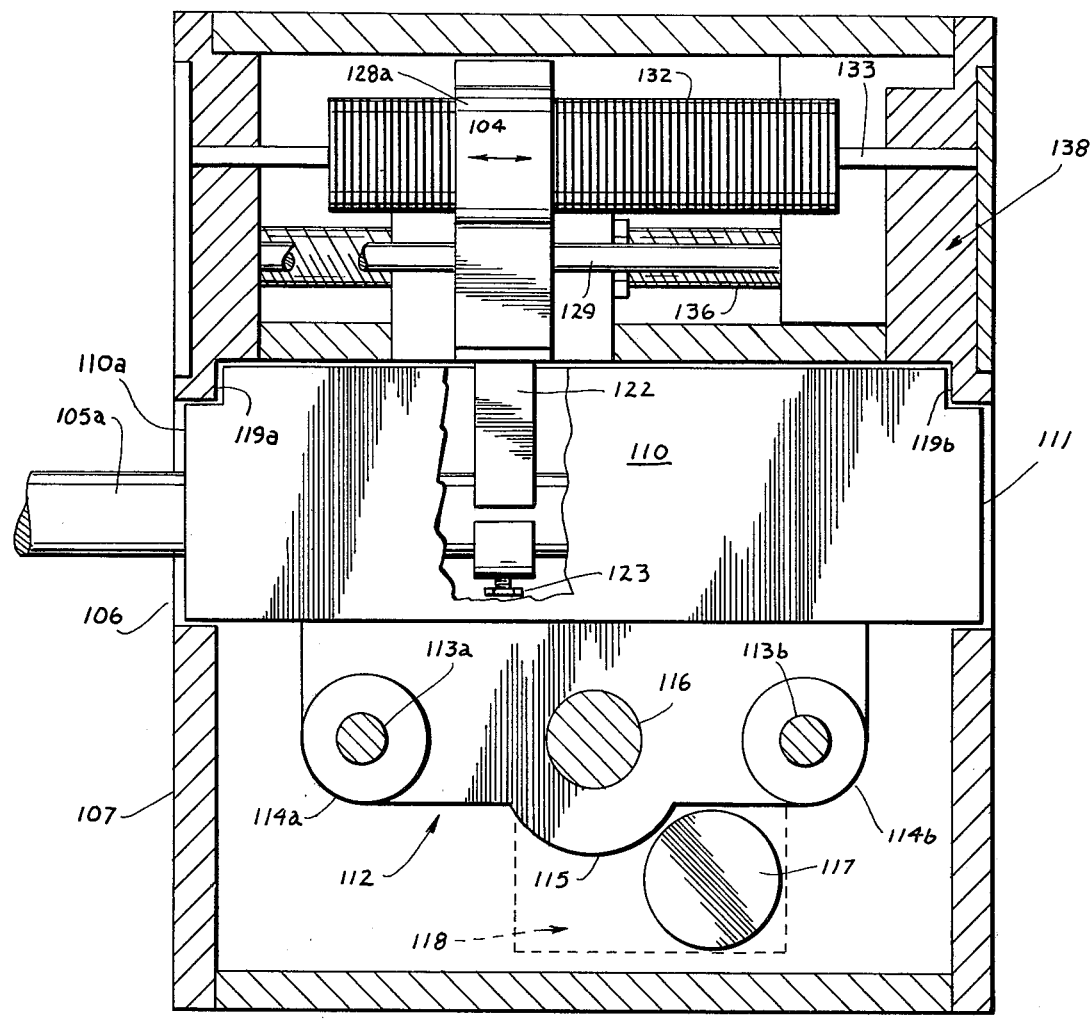
FIG. 7A is a top plan view of the mechanism shown in FIG. 6.

The foregoing general configuration and arrangement of the inner assembly IS is best seen in FIGS. 3 and 3A, in which the two clamp assemblies CA1 and CA2 each include the corresponding half-clamps CH1, CH1' and CH2, CH2'. The half-clamp CH1' is hidden from view in FIG. 3 by the pipe section P', while the substantial portion for the half-clamp CH2 is hidden by the pipe section P in that FIG. Each of the half-clamps CH2 and CH2' are supported by a corresponding pair of inner clamp arms 80 and 81 which are suspended below the inner clamp cam assembly 82. The inner clamp cam assembly is identical in construction and operation to the outer clamp cam assemblies 23 and 24, described above, with a motor 83 (FIG. 4) being connected to drive a lead screw which selectively moves the inner clamp arms 80 and 81 toward or away from each other.

The half-clamps CH1 and CH1' of the clamp assembly CA1 are likewise suspended from the pair of inner clamp arms 86 and 87, and these two inner clamp arms are suspended from the inner clamp cam assembly 88. The inner clamp cam assembly 88 is identical in construction and operation to the other clamp cam assemblies, and it will be understood that the inner clamp cam assembly 88 includes a lead screw which is power-operated to open or close the inner clamp arms 86 and 87, with respect to each other, along a path which is transverse to the longitudinal dimension of the pipe sections P and P'.

Each of the inner clamp cam assemblies 82 and 88 is suspended from the channel member 67 for gimballed movement with respect to the outer frame and the outer clamp assemblies, which may be securely engaging the pipe sections P and P'.

Each of the half-clamps CH1' and CH2' supports a clamp foot F' which extends radially inwardly from the half-clamp for engaging the respective pipe joint ends 77a and 77b. Each of the clamp feet F' terminates in a pipe-engaging member 92 that is longitudinally offset from the corresponding supportive half-clamp and is spaced radially inwardly therefrom, as best seen in FIGS. 3 and 3A, so that the pipe engaging member 92 can be moved into contact with the uncovered pipe joint ends 77a and 77b while the half-clamps CH1' and CH2' can remain positioned along side the protective coating 75. This longiduinal offset of the clamp feet allows the half-clamps, along with the inner clamp arms 80, 81 and 86, 87, to be longitudinally offset from the joint J to allow room for the welding torch apparatus.

Each of the half-clamps CH1 and CH2 supports a pair of clamp feet F which may be substantially identical to the aforementioned clamp foot F'. As best seen in FIGS. 3A and 4, the three clamp feet F, F, and F' of each clamp assembly CA1 and CA2 provide a symmetrical three-point clamp for one of the joint ends 77a and 77b which comprise the joint J. Each of the clamp assemblies CA1 and CA2 independently engages or disengages the corresponding joint end 77b or 77a as the lead screw associated with the inner clamp cam assembly 82 or 88, respectively is rotated in the proper direction. Once the vertical position of the inner assembly IS has been adjusted by the air bag 70 so that the overall clamp assembly CA (FIG. 3) is concentric with respect to a pipe joint J, it will be seen that the gimbal support assembly GS permits the clamp assembly to undergo three-point engagement with the pipe joint end notwithstanding some degree of misalignment between the clamp assembly CA and the overall support assembly including the rails 21 and 22 of the welding station.

Each of the half-clamps CH1 and CH2 is constructed to provide a track 94 which is parallel to a circumferential portion of the pipe joint J. Each track 92 supports the movable carriage TC for traverse in an arc about the pipe joint J. The carriage TC1 is mounted on the track associated with the half-clamp CH1, as best seen in FIG. 3, and carries a pair of welding head assemblies H1 and H2. The carriage TC2 mounted on the half-clamp CH2 carries another pair of welding head assemblies H3 and H4. The two welding head assemblies on each carriage are positioned at a right angle to each other and are longitudinally offset from the respective half-clamp a distance which places all of the four welding head assemblies in alignment with a common plane which is alignable, by appropriate positioning of inner assembly IS, with the joint J.

A rack gear 95 is mounted on each of the half-tracks CH1 and CH2, and each of the carriages is provided with a drive motor 96 which engages the rack gear and moves the carriage along the arc-shaped track 94 about the respective half-clamp. The drive motor 96 is preferably a precision motor such as a velocity feedback servo drive motor or the like which is capable of moving the carriage along the tack at a precisely controlled rate in response to appropriate input signals. Each carriage also includes a position encoder which provides an output signal corresponding to the exact position of the carriage on the track 94 at all times. The position encoder 97 may engage the rack gear 95 to sense carriage movement along the track.

Since the welding head assemblies H3 and H4 are at the 12 o'clock and 3 o'clock positions, respectively, when the carriage TC2 is at its upper position of travel along the track 94 of the half-clamp CH2, clockwisse motion of the carriage TC2 90° along the track 94 will place the assembly H3 at the 3 o'clock position and the assembly H4 at the 6 o'clock position so that 180° of the pipe joint J are traversed by the 90° movement of the carriage TC2. Similar coverage of the remaining 180° of the pipe joint J is obtained by the welding head assembies H1 and H2 and with 90°0 rotation of the carriage TC1. Since all of the welding has assemblies are longitudinally offset from their carriages to occupy a common plane which is substantially perpendicular to the pipe joint J, the "at rest" or starting position of the carriage TC1 is displaced from 12 o'clock sufficiently to remove assembly H1 from interference with assembly H3 of carriage TC2. The carriage TC1 is moved upwardly to its 12 o'clock position to initiate its portion of a welding pass only after the carriage TC2 has moved downwardly far enough to provide clearance for the welding head assembly H1. A complete operating sequence of the welding system is set forth below.

Each of the four welding head assemblies H1-Hr is identical, and details of a typical welding head assembly H1 are shown in FIGS. 5-7 and 7A. Each welding head assembly is connected to the corresponding carriage TC1 or TC2 by a pair of support rods 100a, 100b which extend inwardly from the carriage and terminate in a bracket 101 to which the head assembly is secured. The head assembly H1 carries a torch support 102 on which is mounted a welding torch assembly T. The head assembly H1 is independently capable of moving the torch support 102, along with the torch assembly T, along a vertical path 103 which is vertically perpendicular to the axis of the pipe joint J being welded, and along a horizontal path 104 which is horizontally perpendicular to that joint. Movement along the vertical path varies the arc spacing between the torch assembly T and the joint J and is operated by the automatic voltage control described below, while movement along the horizontal path 104 oscillates the torch assembly with respect to the joint.

The torch support 102 is mounted at the outer ends of a pair of rods 105a, 105b which extend outwardly from a vertically-elongated opening 106 in the front wall 107 of the welding head assembly H1. Each of the rods 105a and 105b slidably extends through corresponding openings in the front face 110a of the bearing block 110 and extends inwardly to be slidably received through mating openings in the rear face 111 of the bearing block. The bearing block is ocnnected to the vertical travel bar 112, which is supported by the vertical shafts 113a, 113b and the corresponding ball bushings 114a, 114b for vertical reciprocating movement along the path 103. The vertical travel bar 112 has a nut 115 which engages the vertical rotary screw 116. The screw 116 is driven in either direction by the stepping servomotor 117 and the meshing gears 118. It will be understood that the vertical travel bar 112 vertically slides along walls 119a, 119b and, along with the rods 105a and 105b which carry the torch support 102, is moved up or down depending on the rotational direction of the motor 117.

The two rods 105a and 105b extend through openings in the rod clamping block 122 and are positively retained therein by the tightened clamp screw 123. The clamp block 122 slidably extends through the elongated horizontal slot 121 in the bearing block 110 between the front wall 110a and the rear wall 111, and also slidably extends through the vertical slot 124 in the horizontally oscillating travel bar 125. The vertical extent of the slot 124 is at least equivalent to the movement range of the vertical travel bar 112, so that the clamp block 122 is free to move vertically within the slot 124 as the vertical travel bar and the block 110 are moved by the motor 117.

The oscillating travel bar 125 is connected to the linear ball bushing 128 which is supported for reciprocal movement along the support shaft 129. Clamped to the ball bushing 128 at 128a for oscillation therewith is the coil 132 of a linear variable differential transformer (LVDT), which moves horizontally with respect to the LVDT core 133 as the bushing 128 moves horizontally.

Connected to the oscillating travel bar 125 is a nut 136 whch engages the horizontal screw 137. The screw 137 is connected by gearing 138 to the stepping servomotor 139, so that the travel bar 125 moves along the horizontal pah 104 to an extent and in a direction determined by operation of the motor 139. Clamp block 122 is carried with the travel bar 125 to slide within the horizontal slot 121 in the block 110. Since the rods 105a and 105b are secured to the clamp block 122, the torch support 102 is moved horizontally by operation of the motor 139 and the horizontal position of the torch assembly T is sensed by the output of the LVDT coil 132. It will be understood that theoutput of the LVDT is linearly proportional to the displacement of the coil 132 relative to the core 133, with the coil output being zero volts when centered on the core 133 and with the voltage increasing positively with horizontal movement of the coil in one direction and negatively with coil movement in the other direction.

The torch assembly T is best seen in FIGS. 5 and 8, and includes a torch body 146 that is retained within the torch base 147 by a quick-disconnect attachment which enables the entire torch body to be rapidly removed from a torch base without the use of tools, and without disconnecting welding current, coolant, or shielding gas lines. The torch base 147, which is connected to the torch support 102 by the bolt 148, has an internal opening 149 in the shape of a conic section, and the torch body 146 has an external conic portion 150 which mates with the internal opening in the torch base. The torch base 147 and the conic portion 150 of the torch body are made of a material, such as brass or the like, having good electrical and thermal conductivity, and preferably having good resistance to corrosion.

Internal passages 153 are provided within the torch base 147 for circulating a suitable cooling fluid such as water or the like. A gas passage 154 is connectable to receive a conventional arc shielding gas and extends through the torch base 147 to a port 155 on the surface of the internal opening 149. An annular channel 156 is formed in the conic portion 150 of the torch body 146, at a location thereon which mates with the port 155 when the torch body and the torch base are assembled as shown in FIG. 8. A gas passage 156 extends within the torch body 146 from the annular channel 156 to the space defined between the electrode passage 158 and the electrode 159 positioned therein, so that shielding gas entering the gas passage 154 can flow through the passage 157 and vents along the electrode 159 to form a gaseous arc shield at the torch end 160 in the conventional manner. The annular chamnel 156 enables the torch body 146 to be installed within the torch base 147 without regard to alignment of passages for the shielding gas.

A cylindrical lock ring 164 is affixed to the torch body 147 and has several cam slots 165 which are open as at 166 to the upper end of the lock ring. Four such cam slots 165 are provided in the lock ring 164 of the disclosed embodiment, and the torch body 146 has a corresponding number of cam fingers 167 which are received into the cam slots through the open portions 166. The fingers 167 extend radially outwardly from the lower end of the sleeve 168 which surrounds the electrode passage 158. A threaded connection is provided between the lock ring 164 and the torch base 147, so that the vertical position (as seen in FIG. 8) of the cam slots 165 can be adjusted as necessary to ensure that the conic portion 150 of the torch body 146 becomes firmly seated within the internal opening 149 of the torch base 147 before the cam fingers 167 reach the inner ends of the respective cam slots 165.

Secured to the upper end of the sleeve 168 is the ring 169, which preferably has a roughened external surface of sufficient diameter to be easily grasped and turned by a person wearing gloves or mittens. The ring 169 may be made of an insulating material such as phenolic, so that the ring can be held while inserting or removing the torch body 146 from the base 147 without exposure to welding voltage which is typically applied to the entire torch base.

An electrode adjusting knob 172, which may also be made of an insulating material, extends concentrically upwardly from the ring 169 and provides a threaded connection with the collet mechanism 173 which retains the electrode 159 within the passage 158 of the torch body. The electrode 159 is thus longitudinally movable relative to the torch end 160 by rotating the knob 172. Details of the collet mechanism 173 are conventional and need not be described further herein.

Since the entire torch body 146 is readily removable from the torch base 147 simply by a quarter-turn of the ring 169, without using any tools or disconnecting any connections to the torch body, on-site replacement of an electrode 159 can be made simply by substitution of an entire torch body 146. The removed torch body can then receive a new electrode in a repair shop, where the replacement electrode can be longitudinally pre-adjusted to a gauge corresponding to the position of a pipe joint J with respect to the torch base 147, while the torch assembly T continues operating with the substitute torch body, thereby minimizing the downtime of the torch assembly.

Each torch assembly T which utilizes the aformentioned hot-wire process is supplied with filler wire from a separate spool 180 by way of a wire drive 181 and the flexible hollow guide tube which conveys the feed wire to a point adjacent the lower end 160 of the torch assembly. Those skilled in the art will realize that a flow of electrical current, preferably AC, for $I^2R$ heating purposes is established between the filler wire and the weld puddle at the pipe joint J by passing the wire through an electrical contact tube 183 located adjacent the torch T.

The wire drive 181 includes a motor 184 which is operated at a selectably variable rate, in a manner described below, to feed wire from the spool 180 to the torch assembly T. The motor 184 preferably includes a velocity-feedback servo or is otherwise equipped to convey filler wire at a steady rate which is determined by operating signals supplied to the motor.

Figure 10:
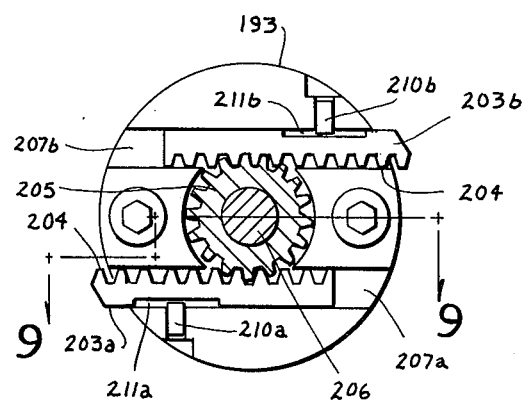
FIG. 10 is a section view taken along line 10—10 of FIG. 9.

Each spool 180 is removably supported in a spool holder 188 having a mandrel 189 capped by a latching knob 190. As best seen in FIGS. 9 and 10, the mandrel 189 extends outwardly from the plate 190, and both the plate and the mandrel are interconnected for rotation relative to the body 191. A button 192 on the upper side of the plate 190 engages a corresponding recess in the underside of each filler wire spool 180, so that the plate 190 rotates with the spool as filler wire is withdrawn by the wire drive 181.

A number of pressure pins 194 extend through and beyond the body 191 to contact the underside 195 of the plate 190. The opposite ends of the pressure pins 194 are in contact with the ring 196 at the lower end of the body 191, and the ring is biassed toward the plate 190 by a number of compression springs 197 which are retained between the ring an the end member 198. The end member 198 may be attached to the body 191 by the threaded connection 199, so that the compressive force of the springs 197 against the ring 196 can be adjusted by rotating the end member 198 relative op the body 191. The upward force of the ring 196 against the pressure pins 194 provides frictional drag force on the plate 190, so that filler wire is removed from the spool 180 against an adjustable constant drag force.

Contained within the latching knob 193 is a pair of latch fingers 203a and 203b, seen in FIG. 10, each of which has an inner side provided with rack teeth 204 which engage a gear 205 connected to a shaft 206 that is turned by rotation of the latching knob 193. Each of the latch fingers 203a and 203b is slidably mounted within a corresponding passage 207a and 207b within the uppermost portion of the mandrel 189, and the dowel pins 210a and 210b fit within corresponding slots 211a and 211b to limit the inner and outer travel of the latch fingers.

The latch fingers may have a sloped lower surface, best seen in FIG. 10, which can engage the outside of a filler wire spool 180 to urge the spool downwardly into firm contact with the plate 190 and the button 192, so that the spool 180 is quickly latched into position with only a partial turn of the latching knob 193. The latching knob is preferably in the shape of an enlarged truncated. cone, as seen in FIGS. 4 and 9, to aid in guiding the feed wire spools onto the mandrel 189 and for ease of rotation by a workman wearing gloves or mittens.

Control System

The movement of each carriage TC about its respective clamp half occurs independently of the other carriage, although it is stated above that the relative positions of the carriages TC1 and TC2 ar interrelated for certain purposes. The operating parameters of each welding head assembly H1 through H4 are controlled independently of any other welding head assembly, with the values of the operating parameters being independently determined by factors such as the angular position of the carriage which supports the head assembly, sensed parameters, and preselected inputs for various parameters. Control of the overall system disclosed herein is provided through the control system shown generally in FIG. 11, in which a central processor 214 interfaces through the input/output means 215 with the control circuits 216a–216d independently associated with each of the welding head assemblies H1-H4. The central processor 214 also supplies signals through the interface 215 to the carriage control circuits 218--1 and 218--2, which individually drive the separate carriage positioning motors 96-1 and 96-2, and receives carriage position signals from the separate carriage position encoders 97-1 and 97-2.

A transverse section of a typical welded pipe line joint of the type attainable with the present apparatus is shown in FIG. 12, wherein the abutting ends 77a and 77b of pipe sections P and P' have been prepared by grinding or otherwise removing metal to form the beveled surface 452 extending from the outer surface of the pipe inwardly to the land 453. The lands 453 extend circumferentially around unremoved portions 454 of pipe metal which are abutted to provide the root of the joint J to be welded.

The initial welding pass, or root pass, mechanically joins together the two abutting portions 454, and may penetrate the pipe sufficiently to provide the slightly convex bead 455 about the joint J within the pipe. The root pass need not extend completely between the confronting beveled surfaces 452. The next welding pass, or "hot pass", is applied over the root pass to reshape and anneal the root pass. In typical operation of the present welding apparatus, the welding torch assemblies do not oscillate while welding the root pass and the hot pass.

Following the hot pass, one or more filler passes are applied to substantially fill the joint J with weld metal.

It will be understood that the weld parameters of each welding torch assembly should be selected to maximize the rate of filler metal deposition during the hot passes. The joint J is completed by covering the final filler pass with a pair of cap passes which overlap one another as shown at 457.

Figure 13:
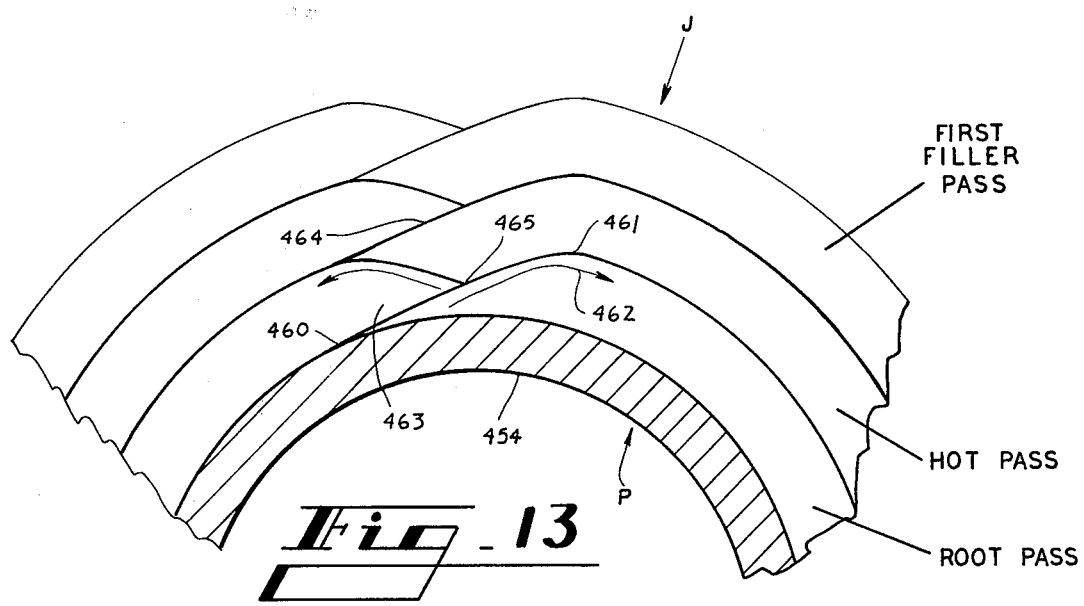
FIG. 13 is a partial circumferential section view, shown somewhat enlarged, of the weld of FIG. 12.

A section view of a typical joint J welded with the present apparatus is shown in FIG. 13. The root pass commences at 460 as the welding arc is established, and slopes outwardly to attain maximum thickness at point 461 as the welding head assembly commences to traverse a sector of the pipe, as indicated by the arrow 462. The apparent terminal overlapping portion 463 of the root pass is actually the upsloping initial portion of the root pass produced by welding head assembly H4 which was moved to the 12 o'clock position to commence welding at point 465 after H1 is moved out of position, as discussed above. The complete root pass and each subsequent pass includes four such overlapped joints disposed about the circumference of the joint J.

The hot pass commences at point 464, and each subsequent welding pass similarly starts and finishes on slopes to provide overlapping joints as shown in FIG. 13, so that the several weld passes smoothly overlap one another without abrupt step-shaped discontinuities. The starting and finishing slopes are provided by apparatus described below.

A typical example of a weld pass sequence with the present apparatus is shown in FIG. 14. A number of the weld parameters for any welding sequence, including the sequence depicted in FIG. 14, are predetermined for the particular weld pass and the type of joint, and are programmed to take place at selected points during the particular weld sequence. It should be understood that the weld parameters are "programmed" in the sense of being operator-predetermined, possibly by trial-and-error experimentation for a particular type and diameter of pipe, for example, as well as for each kind of welding pass to be used, and input into the system either by appropriate control settings or by information stored in a suitable memory and utilized throughout the selected weld sequence according to an appropriate operational program of the central processor 214. The level of computer programming ability necessary to accomplish such sequential operational programming of predetermined stored weld parameters is well within ordinary skill of the art.

The depicted weld sequence starts at a time indicated at 468 on FIG. 14, and may be initiated by any suitable manual control. The supply of coolant and shielding gas to each torch assembly T commences at time 468 and continues throughout the welding sequence. At the same time, each torch moves vertically inwardly as shown at 469, through operation of the automatic voltage control, until the torch contacts the joint J at time 470. After contacting the joint, each torch is independently retracted as indicated at 471 for a predetermined time and at a known rate which causes each torch to have a predetermined spacing from the joint, even though the clamp assemblies CA1 and CA2 may be essentially clamped onto the pipe.

Weld current is applied to each torch assembly at time 473, and an arc is initiated by any suitable technique such as a high-frequency arc starting circuit (not shown) or the like. The weld current starts at a relatively low value indicated at 474 and increases over a predetermined upslope time to reach a programmed value at time 472. The filler wire feed and heating power, as well as the torch automatic voltage control, remain off at this time, and carriage movement has not yet commenced.

The carriage commences movement at a programmed time 475 soon after maximum programmed weld current is attained, and the automatic voltage control is initiated at time 476 to maintain the arc voltage of each torch at a programmed level. The torch oscillation control, if required by the particular weld pass, is also initiated at time 476. The automatic voltage control allows each torch assembly to be alternately retracted and extended as the torch oscillates across the nonuniform depth of the weld joint J, as seen in FIG. 12, so that the arc spacing is automatically adjusted to maintain the programmed arc voltage throughout each oscillation of the torch assembly.

Filler wire feed and AC filler wire heating power commence at time 477, soon after carriage movement commences. It is apparent from FIG. 14 that both the speed at which the filler wire is fed into the weld puddle, and the AC power applied to heat the filler wire, are increased during an upslope time to the maximum programmed values of speed and voltage.

The depicted weld sequence is now fully underway, and the programmed value of carriage speed or any other weld parameter may be varied during the weld pass in response to the circumferential positions of the carriage assemblies, in accordance with "programmed" weld parameters that have previously been determined to be appropriate for the particular torch at various circumferential positions. The programmed weld parameters typically are separately predetermined, programmed, and controlled for each of the torch assemblies so that, for example, the size of an inverted weld puddle on the underside of the joint can be reduced to a point where surface tension and other natural forces acting on the molten metal exceeds the gravitational pull on the metal and prevents the puddle from dropping out of the joint, without similarly restricting the operating parameters of torch assemblies positioned elsewhere about the circumference of the joint.

At time 478 approaching the end of the depicted weld sequence, the automatic voltage control and torch oscillation are turned off and the weld current commences to decline from a programmed level to reach the final current level at time 479, at which point the carriage has reached the end of its programmed arc of travel. The filler wire feed and heating current also commence at time 478 to decrease over a downslope time to terminal levels at time 480, whereupon the feed wire is momentarily reversed to retract the wire from the still-molten weld puddle. It will be understood that the gradual downslope of depicted weld parameters, along with the programmed upslopes at the start of the weld sequence, produces the sloped and overlapped ends of the weld passes shown in FIG. 13. The weld sequence is completed at time 479, although coolant and shielding gas continue to flow through each torch assembly for the cool-down period 481 to allow the weld puddle to solidify. Each torch assembly may be retracted during this time, as shown at 482, and it will be understood that each carriage can now be returned to its programmed starting position to await commencement of the next weld sequence.

Figure 15:
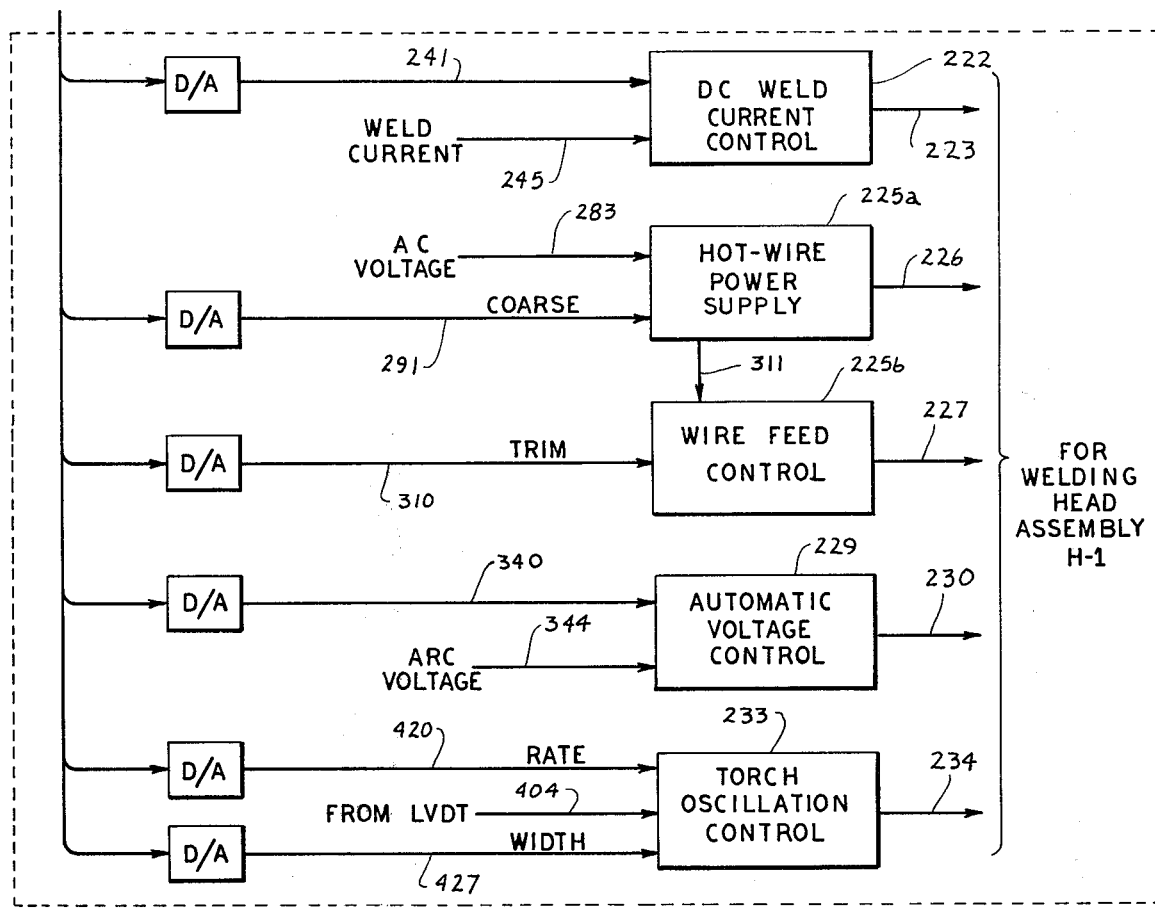
FIG. 15 is a block diagram of the control circuits for one of the four welding head assemblies.

Each of the control circuits 216a–216d may be basically identical, and only a single such circuit 216a is described herein with reference to FIG. 15. The control circuit indicated generally at 216a includes a DC current control 222 which supplies a welding current control signal along the line 223 to the DC power supply for the torch assembly T associated with welding head assembly H1. The hot-wire power control 225a provides an output signal along the line 226 controlling AC power to heat the filler wire being supplied to the torch of the welding head assembly H1, and the wire feed control 225b provides a feed rate signal along the line 227 to the wire feed servomotor 184.

The automatic voltage control 229 provides signals along line 230 to the motor 117 which controls the vertical movement of welding head assembly H1. The automatic voltage control 229 receives an input signal on line 344 corresponding to the actual welding arc voltage of the torch T associated with welding head assembly H1, and provides an output signal along line 230 to adjust the vertical position of the torch as necessary to maintain a programmed arc voltage determined by an input signal supplied on line 340 to the automatic voltage control.

The oscillation control 233 supplies operating signals along the line 234 to the motor 139 which oscillates the welding head assembly H1 on the path 104 (FIG. 5).

Each of the DC current control 222, the hot-wire power supply control 225a, the wire feed control 225b, the automatic voltage control 229, and the oscillation control 233 receives command signals from the central processor 214 and input/output means 215 in response to factors such as the angular position of the carriage TC1, corresponding to desired welding parameters that have been manually or programmatically placed into the central processor. An Allen-Bradley programmable logic controller containing a 4096-word read/write memory provides the central processing function in an actual embodiment of the present invention, although any suitable programmable general-purpose computer can be used. The inputs to the control circuit 216a are received from the input/output means in digital form, and so each of the aforementioned controls is preceded by a digital-to-analog converter labeled "D/A" in FIG. 15. The hot-wire power control 225a receives an input for wire-heating current (which provides a coarse adjustment of filler wire deposition), and the filler wire feed control 225b receives an input for the filler wire feed rate (which provides a fine or trim adjustment of filler wire deposition). The oscillation control 233 similarly receives separate inputs for the rate and width of torch oscillation, and it will become apparent that the center of oscillation can be electronically adjusted through the oscillation control. Those skilled in the art will realize that the welding torch may not be oscillated during the initial passes of the pipe joint J, and that subsequent weld passes of the joint may require differing width and/or rate of oscillation of the torch.

The DC current control 222, as detailed in FIG. 16, includes an amplifier 240 which receives a weld current command signal on the line 241 from the corresponding digital/analog converter. The amplified weld current command signal goes to a multiplier circuit 242 for a purpose described below, and the output of the multiplier circuit is supplied to the summing point 243 associated with the input of the summing amplifier 244. A feedback signal corresponding to the actual DC welding current is obtained from a shunt (not shown) in series with the welding current supplied to the torch T, and the signal at 245 from the current shunt is amplified at 246 and also supplied to the summing point 243. Potentiometer 247 across the amplifier 246 provides feedback adjustment. The voltage level at the summing point 243 can be adjusted by the potentiometer 248.

The output from the summing amplifier 244 is determined by the difference, if any, between the welding current command signal on line 241 and the measured weld current signal on line 245. Resistance 252 and capacitance 253, series-connected in shunt across the summing amplifier 244, provide an integral plus proportional compensator which provides a zero output when the difference between the command and measured current signals is a steady-state value. Relay contact 254 is connected in shunt across resistance 252 and capacitance 253, and the contact 254 is opened only in response to a signal on line 255 (which may be obtained in the programmed weld sequence) denoting that the welding arc is turned on. The shunt contact 254 ensures that capacitance 253 will be discharged at the time welding current commences, so that no charge remains on the capacitance to provide a false welding current control signal.

The output signal from the summing amplifier 244 is amplified at 258 and supplied on the line 259 to control a conventional DC welding current source, such as a magnetic amplifier DC current control means. The described DC power control circuit provides AC line compensation while supplying a constant DC current to the welding torch. Feedback control of the DC power is accomplished through relatively low voltage signals that are compatible with the command signals provided by the input/output means 215 associated with the central processor. Static volt-ampere characteristics of a conventional open-loop, drooping characteristic DC welding current source are shown at 483 in FIG. 23A. The constant-current static volt-ampere characteristics of the same welding current source operated with the present DC power control circuit are shown at 484 in FIG. 23B.

The sudden application of full commanded welding current to the torch T can generate an arc of sufficient intensity to blast a hole in the workpiece, while the abrupt removal of welding current from the torch at the end of a pass can cause a crater in the weld metal. These unwanted effects are prevented by the weld current slope circuit indicated generally at 261 in FIG. 16, and including the amplifier 262 which supplies a control signal to the multiplier 242. The amplifier 262 receives an input signal either from the up-slope potentiometer 263 through normally-open contactor 264, or from the down-slope potentiometer 265 through normally-open contactor 266. The amplifier 262 functions as an integrator circuit, and the output at fixed point 267 is clamped by the zener diode 268 across the amplifier 262 to be not less than zero volts.

The contactor 264 is closed when a typical programmed welding sequence is initiated, as described above in greater detail, and the voltage at fixed point 267 is integrated from zero up to a level determined by the setting of potentiometer 263, and at a rate determined by the potentiometer 271 in series between the contactor 264 and the amplifier 262. The voltage at the point 267 is applied to the multiplier 242, so that the output from the multiplier to the summing point 243 is a product of the welding current command signal and the upwardly-increasing signal at fixed point 267. A predetermined minimum starting value for the welding current may be provided, if desired.

Approaching the end of a programmed welding sequence, the contactor 264 is opened and the contactor 266 is closed to cause the amplifier 262 to integrate the voltage at point 267 downwardly toward a final value determined by the setting of potentiometer 265, and at a rate determined by the potentiometer 272. The voltage at point 267 is also applied to the amplifier 273, which provides an output signal to the flip-flop 274 when the voltage at point 267 diminishes to a level determined by the setting of the down-slope termination potentiometer 275. The signal appied to the flip-flop 274 operates the transistor switch 276, providing along line 277 an end-of-slope signal which denotes that the welding operation is terminated for a particular welding head assembly. The setting of the down-slope termination potentiometer 275 thus selects the minimum welding current at which the arc is extinguished.

The hot-wire current control 255a is shown in FIG. 17, and includes the amplifier 282 receiving an input signal supplied by line 283 and corresponding to the actual AC voltage supplied to heat the filler wire at the torch T associated with the particular welding head assembly. Output from the amplifier 282 goes to the RMS circuit 284, which supplies along line 285 an output signal proportional to the RMS value of the AC heating current signal on line 283. The RMS signal on line 285 is supplied to the summing point 286 of the summing amplifier 287.

An AC heating voltage command signal supplied from the central processor 214, through the appropriate digital/analog converter, is supplied on the line 291 to the amplifier 292, the output of which is supplied to the multiplier circuit 293. The output from the multiplier circuit 293 is amplified at 294 to provide a filler wire heating command signal which is supplied to the summing point 286. The multiplier circuit 293 receives a control signal along the line 295 from the upslope/-downslope circuit 296, which functions in a manner similar to the slope circuit 261 described with respect to FIG. 16.

The summing amplifier 287 is bypassed by the series resistance-capacitance circuit 299 to provide integral plus proportional compensated output to a conventional firing circuit 300 which sets the firing angle of SCRs 301 connected in the primary circuit of the transformer 302. The secondary winding of the transformer 302 is connected in series with the inductor 303 to supply heating current to the filler wire heating circuit. The inductor 303 provides the desired voltage-current slope of power supplied to heat the filler wire, and such inductors are known to those skilled in the art. The voltage across the secondary winding of the transformer 302 is fed back along the line 283 to provide the input signal to the amplifier 282.

The AC power control circuit 225a functions to provide an output signal from the summing amplifier 287 to the firing circuit 300 which will maintain the RMS output voltage from the transformer 302 at a level which is determined by the AC power command signal supplied on the line 291. The AC power supply to heat the filler wire is applied on an upslope at the commencement of welding and is terminated on a downslope near the end of welding, by the circuit 296, in a manner that is analogous to the upslope and downslope of DC welding current as described above. The described AC power control circuit provides AC line compensation while supplying a constant RMS AC voltage to the filler wire for $I^2R$ heating. Feedback control of the AC power is accomplished through relatively low voltage signals that are compatible with the command signals provided by the input/output means 215 associated with the central processor.

The wire feed control 225b, shown in FIG. 18, includes an amplifier 309 connected to receive an input command signal on the line 310 from the appropriate digital/analog converter. The filler wire feed rate command signal on the line 310 is interconnected through the line 311 with the filler wire heating power command signal supplied on line 291, FIG. 17, so that control of the filler wire heating power and feed rate are operationally interrelated. It will be understood that a commanded increase in the feed rate of the filler wire will require a corresponding increase in the AC power necessary to maintain the desired heating rate of the filler wire; a commanded change in the AC heating power will necessitate a corresponding adjustment in the feed rate of the filler wire.

The potentiometer 312 provides a scale adjustment input to the amplifier 309, and the output of the amplifier goes to the multiplier circuit 313. The upslope/-downslope circuit shown generally at 314 also provides an input to the multiplier circuit 313 to modify the wire feed command signal in a manner similar to the slope adjustment circuits described above, so that the output of the multiplier circuit on line 315 provides a reference signal corresponding to commanded or desired wire feed rate.

The signal on the reference line 315 is amplified at 318 and 319, and supplied through diode 320 to a servoamplifier which drives the wire feed servomotor 184 corresponding to the particular weld head assembly. The wire feed servoamplifier may include an operational input which receives the feed command signal as aforementioned, and also a velocity feedback signal generated by a tachometer integral with the wire feed servomotor.

When the filler wire feed is terminated at or near the end of a welding operation, the filler wire conventionally remains in the molten weld puddle and adheres thereto, or forms a ball of molten metal at the end of the filler wire, either of which requires manual intervention of an operator. That problem is overcome with the automatic filler wire retract circuit as shown generally at 321, in which the wire feed signal from amplifier 319 is supplied along line 322 to an input of the amplifier 323. An adjustable bias from the potentiometer 324 is maintained on the amplifier 323, and the output of that amplifier is supplied through the RC differentiator circuit 325 to the timing circit 326. Potentiometer 327 adjusts the period of the timer 326.

During normal commanded wire feed, the signal on the line 322 overcomes the bias on the amplifier 323 and no operating output is supplied through the differentiator 325 to the timer 326. As programmed downslope of the commanded wire feed rate occurs while approaching the end of a weld cycle, however, the voltage on the line 322 decreases to a point where the amplifier 323 commences providing an output signal which is differentiated at 325 and activates the timing circuit 326 to provide an output signal on the line 328 for a time determined by the setting of potentiometer 327. The signal on the line 328, as amplified at 329 and passed through diode 330 to the filler wire servoamplifier, has opposite polarity to the wire heating signal supplied through the diode 320. The filler wire servomotor responds to the signal from the servoamplifier by reversing direction, for a time determined by potentiometer 327, to retract the filler wire from the weld puddle. In that manner, the filler wire is withdrawn from the weld puddle before forming a ball or becoming entrapped in the solidified puddle.

Figure 19:
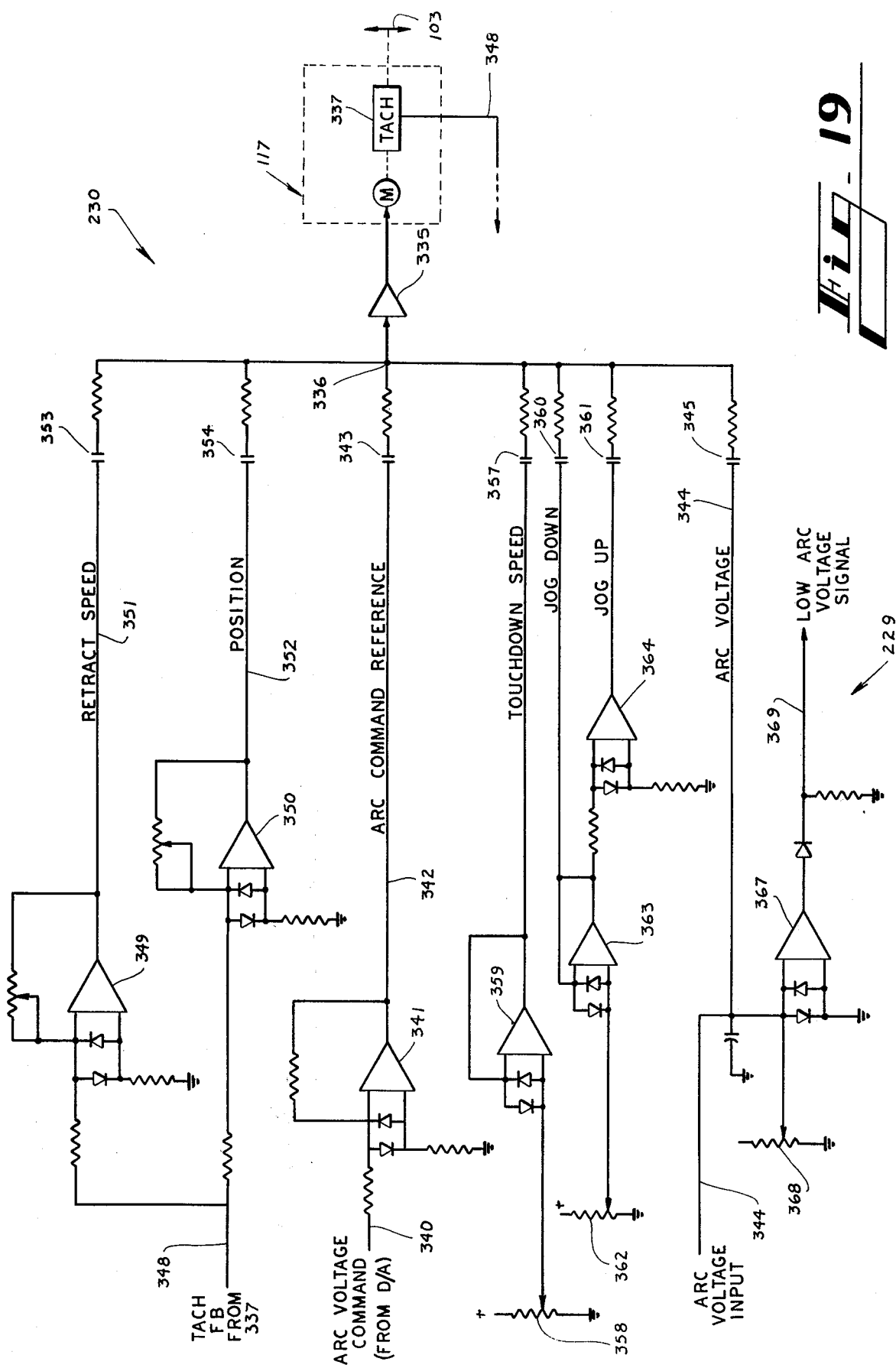
FIG. 19 is a schematic diagram of the automatic voltage control for one of the welding head control circuits of the present invention.

The automatic voltage control 229 is shown in FIG. 19 in relation to the motor 117 which drives a typical weld head assembly H1 for movement along the vertical path 103, and it will be seen that the motor 117 in the disclosed embodiment is a servomotor including an output tachometer 337. Input to the summing amplifier 335 is obtained from the summing point 336, which selectively receives signals from one or more sources as contained in the following description of the automatic voltage control circuit.

The arc voltage command signal is received on line 340 from the appropriate digital/analog converter, and applied through the amplifier 341 to provide an arc voltage command reference signal on the line 342. The arc voltage command signal can be supplied through the switch contact 343 to the summing point 336. Measured arc voltage may also be applied to the summing point 336 along the line 344 and the switch contact 345, and it will be understood that the summing amplifier 335 controls the servomotor 117 to change the vertical spacing between welding torch and pipe joint J in response to a difference between the arc voltage command signal on line 342 and the measured arc voltage signal on line 344. The vertical position of welding head assembly H1 is thus automatically adjusted as necessary to maintain a commanded arc voltage as that welding head assembly is traversed around the pipe joint J, so that predetermined arc voltage for the particular welding head assembly is maintained notwithstanding slight eccentricity between the pipe axis and the particular clamp assembly CA. Of course, the commanded arc voltage input on line 340 can be changed for various circumferential positions of each welding head assembly, and/or for particular welding passes, independently of any other welding head assembly, thereby producing a corresponding change in the vertical position of the welding head assembly to provide the commanded arc voltage.

Rate stabilization of the servomotor 117 is provided by feeding back the velocity signal from the tachometer 337 through the line 348 to the parallel feedback circuits including the amplifiers 349 and 350. The outputs of the amplifiers 349 and 350 are supplied along lines 351 and 352 to the summing point 336 through respective switching contacts 353 and 354. The contact 354 is closed to provide rate feedback along the line 352 during an on-going welding operation as aforementioned.

At initiation of a welding operation, as is more apparent from the sequence example discussed above, each welding head assembly is initially moved downwardly until the electrode contacts the joint J. Downward movement is accomplished by closing the switching contact 357 to apply to the summing point 336 a work touchdown speed voltage derived from the potentiometer 358 and the amplifier 359. Rate feedback is applied to the summing point 336 through the closing of switching contact 353. Thus in the touchdown mode the servomotor 117 operates as a precision velocity servo while in the normal weld mode it functions as a position servo. When the torch electrode contacts the pipe joint or other workpiece, as detected by any suitable technique such as the establishment of electrical continuity between the electrode and the workpiece, the contact 357 is opened and the contact 353 is closed to provide a head retract signal which drives the servomotor 117 to move the welding head assembly away from the workpiece at a predetermined retraction speed. The welding head assembly can thus be retracted from the workpiece for a predetermined time by suitable timing apparatus (not shown), at a predetermined rate provided by the feedback circuit including amplifier 349 and line 351, so that the welding head assembly can be retracted to a known location with respect to the workpiece immediately below the torch electrode. The servomotor 117 operates in the retract mode as a precision velocity servo as described above for the touchdown mode.

Additional velocity signals are selectively applied to the summing point 336 through the switching contacts 360 and 361, as obtained through the potentiometer 362, the amplifier 363, and the amplifier 364, to jog the particular welding head assembly up or down in response to a suitable manually-operated jog input control.

The measured arc voltage on line 344 is also supplied as an input to the comparison circuit 367, which receives a minimum arc voltage reference signal from the potentiometer 368. When the measured arc voltage on line 344 falls below a minimum arc voltage as determined by the setting of the potentiometer 368, a low arc voltage signal is applied on line 369. The low arc voltage may be used through suitable control logic to interrupt the welding sequence for the particular welding head assembly.

Figure 20:
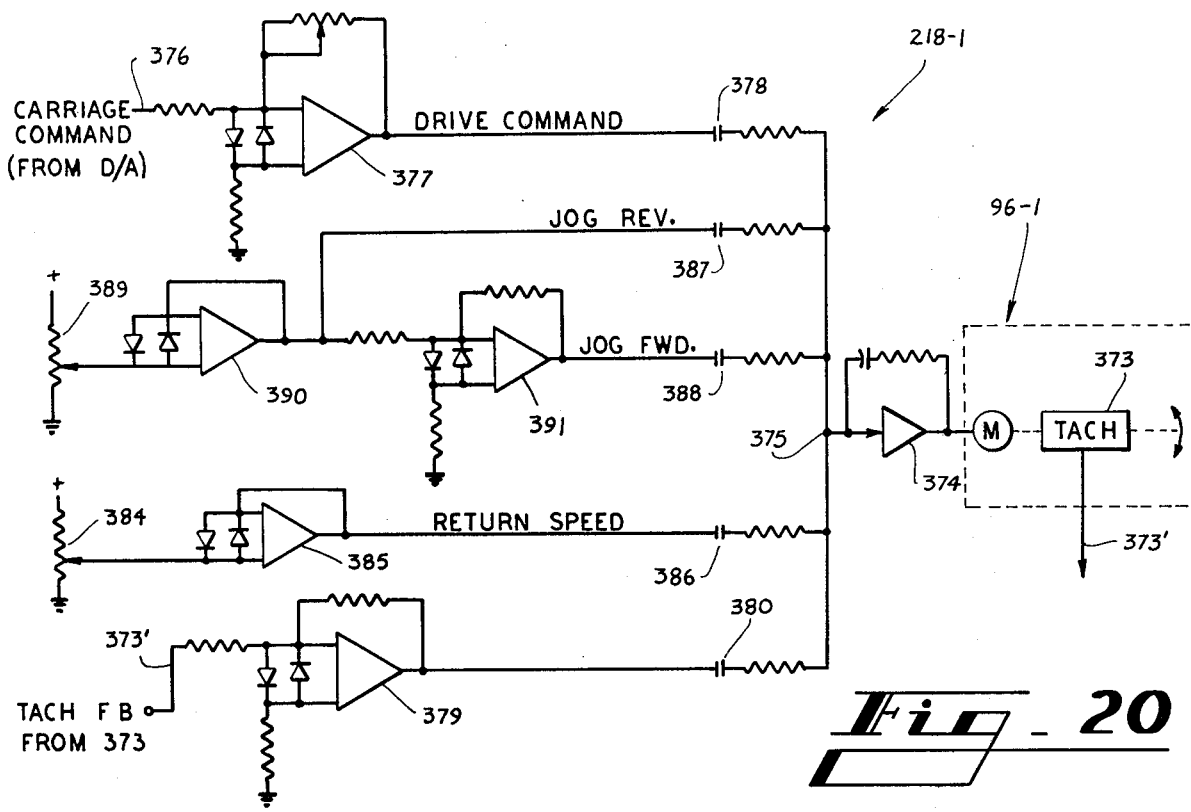
FIG. 20 is a schematic diagram of the carriage control for one of the welding torch carriages of the present invention.

Turning to the description of a typical carriage control circuit 218--1 as shown in FIG. 20, it is seen that carriage TC1 is driven by a motor 96-1 comprising a servomotor and a tachometer generator 373. An input summing amplifier 374 operates in response to the sum of voltages applied to the summing point 375. Forward travel of the carriage during a welding sequence is obtained in response to a carriage command signal applied on line 376, from the appropriate digital/analog converter, through amplifier 377 to provide a carriage drive command reference signal through switch contact 378 to the summing point 375. Rate feedback of the carriage servomotor 96 is obtained by applying a rate signal from the tachometer 373 as an input on line 373' to amplifier 379, for return to the summing point 375 through switching contact 380.

Upon the completion of carriage travel at the end of a welding cycle, it is desirable to return the carriage to a predetermined initial position at a relatively high return speed. Rapid carriage return is obtained through the return speed control circuit including the potentiometer 384, the amplifier 385, and the switch contact 386 which is closed, either manually or by appropriate logic means, after all welding head assemblies of the particular carriage have completed their respective welding sequences for a particular pass of the carriage.

The carriage can also be jogged in the forward or reverse directions, by respective closure of switching contacts 387 or 388, through jog rate circuitry including the potentiometer 389, the jog reverse amplifier 390, and the jog forward amplifier 391. It will be understood that the switching contacts 387 and 388 for jog control may be operated in response to an appropriate manual input.

Figure 21:
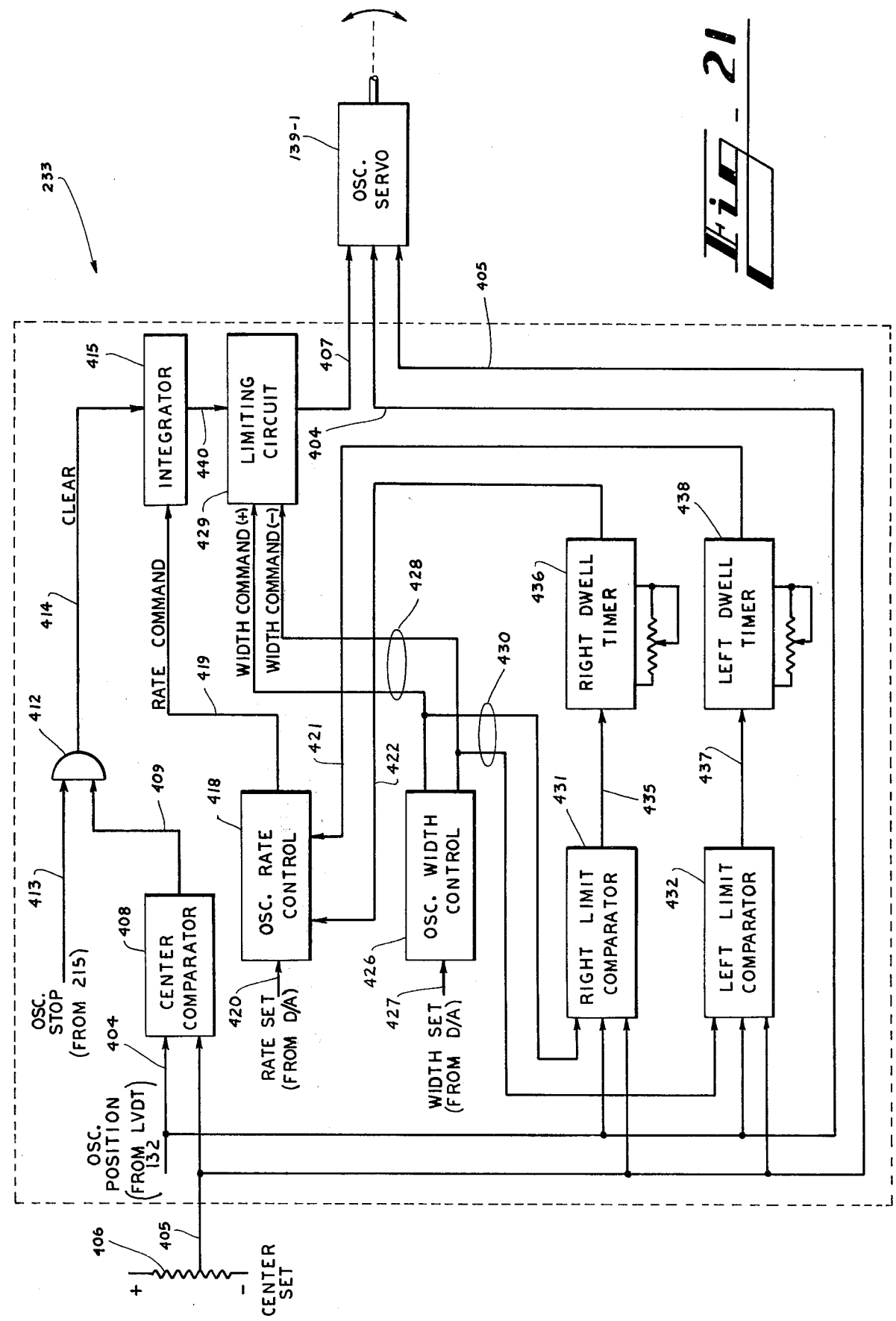
FIG. 21 is a semi-schematic block diagram of the torch oscillation control for one of the welding head control circuits of the present invention.

A block diagram of the oscillation control 233 is shown in FIG. 21, and the operation of the oscillation control is better understood by reference to the position control waveforms of FIGS. 22A and 22B. The oscillation control 233 operates the oscillator servomotor 139--1 of the related welding head assembly H1 to move the torch assembly across the pipe joint J at a constant velocity, and at a rate and width of movement which are independently adjustable. The left and right limits of travel are determined electronically, without external limit switches or motion stops, and the welding head assembly is capable of remaining at the left and/or right motion limits for independently-adjustable periods of dwell time. The centerpoint of oscillation across the weld joint is adjustable, so that the torch assembly can be "centered" directly above the joint by adjusting a control such as a potentiometer or the like, before initiating a particular weld sequence.

As mentioned above, the LVDT coil 132 senses the position of the oscillating torch assembly, to provide an output voltage which is linearly proportional to the displacement of the torch assembly. The LVDT preferably provides zero volts output when the torch assembly is at the mechanical center of its maximum oscillation width, with output voltage going positive in one direction of movement from mechanical center and going negative with movement in the other direction. Referring to FIG. 22A, the zero-volt center line represents the mechanical center of oscillation, with positive-voltage departures representing horizontal movement to the right of center and with negative voltage representing movement to the left of center. Where the electrically-set center of oscillation corresponds to the mechanical center of oscillation, as illustrated in FIG. 22A, the center is represented by zero volts and the width of oscillation is represented by two signals of equal voltage and opposite polarity. Thus, the right limit is represented by 3 volts and the left limit is represented by −3 volts. The slope of the movement line 398 corresponds to the rate of horizontal movement, and the right or left limits of oscillation are determined when position voltage from the LVDT corresponds to the preset aforementioned right or left limit voltages. The right dwell and left dwell periods are denoted on FIG. 22a.

Turning next to FIG. 22B, it is there assumed that the torch assembly has been centered over a welding joint by displacement from the mechanical center, represented by the zero-volt line 399, to the 3-volt line 400 corresponding to a certain displacement to the right of mechanical center. The width of torch assembly movement shown in FIG. 22B is the same as the width in FIG. 19A, namely, horizontal movement represented by ±3 volts of LVDT movement with respect to the offset 3- volt "center line" 400.

Turning to FIG. 21, the oscillator servomotor 139--1 receives a position feedback input along the line 404 from the LVDT, a center set signal along the line 405 from a suitable source of variable voltage such as a potentiometer 406 connected across a suitable voltage source, and a position 406 connected across a suitable voltage source, and a position command signal on line 407. The position feedback signal on line 404 and the center set signal on line 405 are also supplied to the center comparaor 408, which senses when the torch position signal on line 404 is equal to the center set signal on line 405 and provides an output signal on line 409 when such signal equality occurs. The output on line 409 is supplied to the coincidence gate 412, which may also receive an oscillation stop signal along line 413 from the input/output means 215 associated with the central processor. If the stop signal is present on the line 413 when the torch assembly moves through a "center" position corresponding to the center set potentiometer 406, the coincidence gate 412 provides a signal on line 414 to clear and hold the integrator circuit 415, as described below, thereby stopping the torch assembly at the center position determined by potentiometer 406. An example of such center signal coincidence is shown at 416 in FIG. 22B.

The rate of torch assembly oscillation is determined by the oscillation rate control circuit 418, which provides alternative rate command signals of equal voltage but opposite polarity on the line 419, as an input signal to the integrator circuit 415. The magnitude of the rate command signals provided by the rate control circuit 418 is determined by the rate set input signal on line 420, from the appropriate digital/analog converter as shown in FIG. 15. The polarity of the rate command signal on line 419 is controlled in flip-flop manner by signals received on the lines 421 or 422, as described below.

The oscillation width signal, as previously mentioned, is represented by two signals of equal voltage and opposite polarity, and such width signals are provided by the oscillator width control circuit 426. The width signal, the amplitude of which is determined by the input on the line 427 from the appropriate digital-/analog converter, is supplied along the lines 428 as a width command signal to the limiting circuit 429, and along the lines 430 to provide an input to the right limit comparator 431 and the left limit comparator 432. Each of the right and left limit comparators also receive the oscillator position input signal from line 404, and the center set signal from line 405.

The right limit comparator 431 compares the oscillator position signal with a limit signal which is equivalent to the sum of the width signal (from the width control circuit 426) and the center set signal. The right limit comparator 431 provides an output signal on line 435 to the right dwell timer 436 when the oscillator position signal becomes equal to the sum of the center set signal and the positive-polarity width signal, while the left limit comparator 432 similarly provides an output signal on the line 437 to the left dwell timer 438 when the oscillator position signal reaches the sum of the center set signal and the negative-polarity width signal. Each of the right nd left dwell timers 436 and 438 provides an output signal, an adjustable predetermined time after receiving an input signal from the corresponding limit comparator, along the respective lines 422 and 421 to the rate control circuit 418. The polarity of the rate command signal is reversed whenever the rate control circuit 418 receives a signal from either dwell timer.

Considering the operation of the oscillation circuit 233 shown in FIG. 21, it will be understood that the fixed-amplitude rate command signal on line 419 is integrated by the integrator circuit 415 (absent a stop signal on line 413) so that a linear ramp signal is present on line 440 from the integrator circuit. The ramp signal is applied through the limiting circuit 429 to the oscillation servomotor 139--1 to operate the servomotor at a constant speed for traversing the torch assembly across the pipe joint. The slope of the ramp signal on the line 440, and therefore the rate of oscillation, is represented by the movement line 398 on FIG. 22A, for example.

The limiting circuit 429 clamps the ramp output signal of the integrator circuit 415 to the positive and negative switch command voltages which are alternatively present on the lines 428. Referring again to FIG. 22A, when the ramp voltage reaches the −3 volt left limit width command signal, the limiting circuit 429 clamps the ramp voltage to that level as shown at 441, and the oscillation servomotor 139--1 stops to maintain the torch assembly at the left limit of oscillation. Attainment of this left-limit condition is also sensed by the left limit comparator 432, which activates the left dwell timer 438. When the left dwell timer has timed out, the polarity of the rate command signal applied on line 419 from rate control circuit 418 is reversed, and the integrator circuit 415 commences producing a ramp signal 442 (FIG. 22A) of opposite slope relative to the ramp 398. The oscillation servomotor 139--1 thus commences to move the torch assembly back across the joint toward the right limit, which is determined by the positive-polarity width commnd signal and the limiting circuit in a similar manner. The torch assembly continues to oscillate in the foregoing manner until an appropriate oscillation stop signal is applied along line 413 followed by occurrence of a sensed center signal along the line 409, whereupon a signal is applied along line 414 to interrupt operation of the integrator circuit 415 at a time when the torch assembly is at the center set position determined by the potentiometer 406.

Where a particular welding station such as stations A or B herein performs separate kinds of weld passes in succession, such as root pass followed by hot pass, the predetermined weld parameters for each kind of weld pass are programmed as aforementioned and then those weld parameters for a specific weld pass are selected to control that weld pass. Weld pass selection, which determines the set of preprogrammed weld parameters to be used, may be operator-controlled or semiautomatic (for example, with a counter which advances to select the programmed weld parameters for the next weld pass). It follows that a single welding station can perform each weld pass for a complete welded joint, by appropriate programming for the sets of weld parameters for each weld pass, so that a multiple-station pipe laying facility can remain in operation although one of the welding stations may be inoperative.

It should be understood that the disclosed use of the present invention to weld a vertical-plane joint about horizontal pipe is by way of example only, since the present invention is readily adaptable for automatic welding along any path in response to preprogrammed weld parameters chosen for the weld path.

It will be understood that the foregoing relates only to a preferred embodiment of the present invention, and that numerous changes and modifications may be made therein without departing from the spirit and the scope of the invention as set forth in the following claims.

We claim:

1. Apparatus for welding a circumferential joint about a length of pipe, comprising:

guide means supported by the pipe and defining a fixed path of movement in proximately parallel relation to a circumferential joint to be welded;

carriage means mounted on said guide means and operative for movement along said fixed path;

at least one torch support means carried by said carriage means and supporting a welding torch in welding relation to the pipe joint;

said torch support means being selectably operative independently of said carriage means to vary a selected distance between said welding torch and the circumferential pipe joint;

means responsive to a predetermined welding parameter to provide a parameter responsive signal;

means responsive to the location of said carriage means on said fixed path to provide a carriage location signal corresponding to said carriage location;

command means operative to receive and retain selectably variable parameter command signals that correspond to certain locations of said carriage along said fixed path, and further operative in response to said carriage location signals from said location responsive means to provide said parameter command signals which correspond to the actual location of said carriage;

said torch support means being responsive to said parameter responsive signal and to said parameter command signal to adjust said selected distance so that parameter responsive signal maintains a predetermined relation to said parameter command signal;

said torch support means receiving a welding torch including a filler wire feed appartus with filler wire variable drive means;

means operative to supply a selectably variable amount of heating current to said filler wire at said welding torch;

first control means responsive to said parameter command signal from said command means to adjust said heating current in response to a first predetermined selectably variable function of said carriage location; and second control means responsive to said parameter command signal from said command means to adjust the rate at which filler wire is supplied by said filler wire drive means in response to a second predetermined selectably variable function of said carriage location.

2. Apparatus as in claim 1, further comprising means responsive to selected heating current and selected feed rate of said filler wire and operative to maintain a selected deposition rate of said filler wire by adjusting said heating current in response to a change in the selected feed rate of said filler wire, and by adjusting said feed rate in response to a change in the selected heating current.

3. Apparatus for welding a circumferential joint about a length of pipe, comprising:

guide means supported by the pipe and defining a fixed path of movement in proximately parallel relation to a circumferential joint to be welded;

carriage means mounted on said guide means and operative for movement along said fixed path;

at least one torch support means carried by said carriage means and supporting a welding torch in welding relation to the pipe joint;

said torch support means being selectably operative independently of said carriage means to vary a selected distance between said welding torch and the circumferential pipe joint;

means responsive to a predetermined welding parameter to provide a parameter responsive signal;

means responsive to the location of said carriage means on said fixed path to provide a carriage location signal corresponding to said carriage location;

command means operative to receive and retain selectably variable parameter command signals that correspond to certain locations of said carriage along said fixed path, and further operative in response to said carriage location signals from said location responsive means to provide said parameter command signals which correspond to the actual location of said carriage;

said torch support means being responsive to said parameter responsive signal and to said parameter command signal to adjust said selected distance so that said parameter responsive signal maintains a predetermined relation to said parameter command signal;

said torch support means receiving a welding torch including a filler wire feed apparatus;

power supply means connected to supply a selectably variable amount of heating current to said filler wire at said welding torch;

means responsive to the location of said carriage means on said fixed path to provide a carriage location signal; and means operatively associated with said power supply means and responsive to said parameter command signal from said command means to adjust said heating current in response to a predetermined selectably variable function of said carriage location.

4. Apparatus for welding a joint in a workpiece, comprising:

guide means defining a fixed path of movement in proximately parallel relation to the joint to be welded;

carriage means operatively associated with said guide means for selective movement along said fixed path;

a welding torch carried by said carriage means and including filler wire feed means selectably operative to supply filler wire to the weld puddle created by said welding torch;

means operative to supply a selectably variable amount of heating current to said filler wire at said welding torch so as to preheat the filler wire;

first control means responsive to the location of said carriage means along said path to adjust said selected heating current;

second control means responsive to the location of said carriage means along said path to adjust the selected rate at which filler wire is supplied to the weld puddle; and means responsive to selected heating current and selected feed rate of said filler wire and operatively associated with said first and second control means to maintain a selected deposition rate of filler wire by adjusting said heating current in response to a change in said selected feed rate of filler wire, and by adjusting said feed rate in response to a change in said selected heating current.

5. The process of welding a joint along a path at least part of which is displaced from a horizontal plane, comprising the steps of:

establishing an electric arc with the material being welded so as to create a weld puddle of molten metal at a location on the joint;

moving the arc to traverse the path being welded;

supplying preheated filler metal to said weld puddle while moving said arc; and controlling the preheating of said filler metal in response to a selectably variable function of the location along said path, so that the size of said weld puddle does not exceed a size whereat natural forces acting on said puddle retain the puddle in the joint in opposition to gravitational attraction tending to pull the puddle out of said joint at nonhorizontal locations along said path.

6. The process of welding a jont along a path at least part of which is displaced from a horizontal plane, comprising the steps of:

establishing an electric arc with the material being welded so as to create a weld puddle of molten metal at a location on the joint;

moving the arc to traverse the path being welded;

supplying preheated filler metal to said weld puddle while moving said arc; and controlling the preheating of said filler metal and the rate at which said preheated filler metal is supplied to said weld puddle, in response to a selectably variable function of the location along said path, so that the size of said weld puddle does not exceed a size whereat natural forces acting on said puddle retain the puddle in the joint in opposition to gravitational attraction tending to pull the puddle out of said joint at nonhorizontal locations along said path.

7. The process of claim 6, wherein said welding occurs about a circumferential joint of a pipe, and said arc is moved in a circular path proximately concentric with said joint.

8. The process of welding as in claim 6, wherein said electric arc that is established and moved to traverse the region being welded is a nonpulsed electric arc.

* * * * *